US009585103B2

United States Patent
Chen et al.

(10) Patent No.: US 9,585,103 B2
(45) Date of Patent: Feb. 28, 2017

(54) TECHNIQUES FOR CONTROLLING TRANSMISSION POWER IN SHARED RADIO FREQUENCY SPECTRUM

(71) Applicant: QUALCOMM Incorporated, San Diego, CA (US)

(72) Inventors: Wanshi Chen, San Diego, CA (US); Peter Gaal, San Diego, CA (US); Aleksandar Damnjanovic, Del Mar, CA (US); Shimman Arvind Patel, San Diego, CA (US); Kiran Kumar Somasundaram, San Diego, CA (US); Tingfang Ji, San Diego, CA (US); Hao Xu, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 12 days.

(21) Appl. No.: 14/603,839

(22) Filed: Jan. 23, 2015

(65) Prior Publication Data

US 2015/0215874 A1    Jul. 30, 2015

Related U.S. Application Data

(60) Provisional application No. 61/933,801, filed on Jan. 30, 2014.

(51) Int. Cl.
*H04W 52/18* (2009.01)
*H04W 52/16* (2009.01)
(Continued)

(52) U.S. Cl.
CPC ........... *H04W 52/18* (2013.01); *H04W 16/14* (2013.01); *H04W 52/143* (2013.01);
(Continued)

(58) Field of Classification Search
CPC ... H04W 52/18; H04W 16/14; H04W 52/143; H04W 52/146; H04W 52/242;
(Continued)

(56) References Cited

U.S. PATENT DOCUMENTS

| | | | | | |
|---|---|---|---|---|---|
| 7,613,203 B2 * | 11/2009 | Mangin | ................ | H04B 7/2656 | |
| | | | | 370/445 | |
| 8,699,391 B2 * | 4/2014 | Yeon | ................. | H04W 72/0413 | |
| | | | | 370/311 | |

(Continued)

OTHER PUBLICATIONS

International Search Report and Written Opinion—PCT/US2015/012788—ISA/EPO—Apr. 7, 2015.

*Primary Examiner* — Philip Sobutka
(74) *Attorney, Agent, or Firm* — Patterson & Sheridan, L.L.P.

(57) ABSTRACT

Certain aspects of the present disclosure provide techniques for controlling transmission power in shared radio frequency spectrum (SRFS). According to techniques, devices (e.g., BSs, UEs, etc.) transmitting in SRFS band may win contention to the SRFS band for at least a portion of a radio frame period. For example, the radio frame period may include a plurality of subframe periods. The devices may also transmit a first signal at a first transmit power during a first subframe period of the radio frame period and transmit a second signal at a second transmit power during a second subframe period of the radio frame period. For example, the first transmit power and second transmit power may be controlled based, at least in part, on a power level determined for the radio frame period.

28 Claims, 16 Drawing Sheets

(51) Int. Cl.
*H04W 16/14* (2009.01)
*H04W 52/14* (2009.01)
*H04W 52/34* (2009.01)
*H04W 52/42* (2009.01)
*H04W 52/50* (2009.01)

(52) U.S. Cl.
CPC ......... *H04W 52/146* (2013.01); *H04W 52/16* (2013.01); *H04W 52/346* (2013.01); *H04W 52/42* (2013.01); *H04W 52/50* (2013.01)

(58) Field of Classification Search
CPC ..... H04W 52/30; H04W 52/38; H04W 52/04; H04W 52/06; H04W 52/22; H04W 52/24; H04W 52/26; H04W 52/32; H04W 52/34
USPC ......................................................... 455/522
See application file for complete search history.

(56) References Cited

U.S. PATENT DOCUMENTS

| | | | |
|---|---|---|---|
| 2009/0180492 A1 | 7/2009 | Hu | |
| 2010/0232310 A1 | 9/2010 | Hu | |
| 2011/0243078 A1* | 10/2011 | Kim | H04L 5/0085 370/329 |
| 2013/0343288 A1 | 12/2013 | Ratasuk et al. | |
| 2014/0370830 A1* | 12/2014 | Steer | H04W 52/18 455/127.1 |

\* cited by examiner

TECHNIQUES FOR CONTROLLING TRANSMISSION POWER IN SHARED RADIO FREQUENCY SPECTRUM

CROSS-REFERENCE TO RELATED APPLICATION(S)

This application claims the benefit of U.S. Provisional Application Ser. No. 61/933,801, entitled "TECHNIQUES FOR CONTROLLING TRANSMISSION POWER IN SHARED ACCESS RADIO SPECTRUM," filed on Jan. 30, 2014, which is assigned to the assignee of the present application and hereby expressly incorporated by reference herein in its entirety.

BACKGROUND

Field of the Disclosure

The present disclosure relates generally to wireless communication, and more particularly, to techniques for controlling transmission power in shared radio frequency spectrum (SRFS).

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of enhanced Node base stations (eNodeBs) that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

As the demand for mobile broadband access continues to increase, using shared radio frequency spectrum (SRFS), which may include unlicensed radio frequency spectrum (URFS), has been considered to solve the spectrum congestion problem for future wireless needs, not only to meet the growing demand for mobile broadband access, but also to advance and enhance the user experience with mobile communications. However, the SRFS may carry other transmissions, and therefore techniques such as listen before talk (LBT) and carrier clear assessment (CCA) may be required to prevent excessive interference. These techniques may present challenges for controlling transmission power within the SRFS.

SUMMARY

Certain aspects of the disclosure provide a method for wireless communications, by a base station, on a shared radio frequency spectrum (SRFS) band. The method may include winning contention to the SRFS band for at least a portion of a radio frame period. For example, the radio frame period may include a plurality of subframe periods. The method may also include transmitting a first signal at a first transmit power during a first period. The method may further include transmitting a second signal at a second transmit power during a second period. For example, the first transmit power and the second transmit power may be controlled based, at least in part, on a power level determined for the radio frame period.

Certain aspects of the disclosure provide a method for wireless communications, by a user equipment, on an SRFS band. The method may include winning contention to the SRFS band for at least a portion of a radio frame period. For example, the radio frame period may include a plurality of subframe periods. The method may also include transmitting a first signal at a first transmit power during a first subframe period of the radio frame period. The method may further include transmitting a second signal at a second transmit power during a second subframe period of the radio frame period. For example, the first transmit power and the second transmit power may be controlled based, at least in part, on a power level determined for the radio frame period.

Certain aspects of the present disclosure provide an apparatus for wireless communications, by a base station, on an SRFS band. The apparatus may include at least one processor configured to win contention to the SRFS band for at least a portion of a radio frame period. For example, the radio frame period may include a plurality of subframe periods. The at least one processor may also be configured to transmit a first signal at a first transmit power during a first period. The at least one processor may further be configured to transmit a second signal at a second transmit power during a second period. For example, the first transmit power and the second transmit power may be controlled based, at least in part, on a power level determined for the radio frame period. The apparatus may also include a memory coupled with the at least one processor (e.g., with instructions stored thereon for execution by the processor).

Certain aspects of the present disclosure provide an apparatus for wireless communications, by a user equipment, on an SRFS band. The apparatus may include at least one processor configured to win contention to the SRFS band for at least a portion of a radio frame period. For example, the radio frame period may include a plurality of subframe periods. The at least one processor may also be configured to transmit a first signal at a first transmit power during a first subframe period of the radio frame period. The at least one processor may further be configured to transmit a second signal at a second transmit power during a second subframe period of the radio frame period. For example, the first transmit power and the second transmit power may be controlled based, at least in part, on a power level determined for the radio frame period. The apparatus may also include a memory coupled with the at least one processor (e.g., with instructions stored thereon for execution by the processor).

Certain aspects of the present disclosure provide an apparatus for wireless communications, by a base station, on an SRFS band. The apparatus may include means for winning contention to the SRFS band for at least a portion of a radio frame period. For example, the radio frame period may include a plurality of subframe periods. The apparatus may also include means for transmitting a first signal at a first transmit power during a first period. The apparatus may further include means for transmitting a second signal at a second transmit power during a second period. For example, the first transmit power and the second transmit power may be controlled based, at least in part, on a power level determined for the radio frame period.

Certain aspects of the present disclosure provide an apparatus for wireless communications, by a user equipment, on an SRFS band. The apparatus may include means for winning contention to the SRFS band for at least a portion of a radio frame period. For example, the radio frame period may include a plurality of subframe periods. The apparatus may also include means for transmitting a first signal at a first transmit power during a first subframe period of the radio frame period. The apparatus may further include means for transmitting a second signal at a second transmit power during a second subframe period of the radio frame period. For example, the first transmit power and the second transmit power may be controlled based, at least in part, on a power level determined for the radio frame period.

Certain aspects of the present disclosure provide a computer readable medium for wireless communications, by a base station, on an SRFS band. The computer readable medium may include code for winning contention to the SRFS band for at least a portion of a radio frame period. For example, the radio frame period may include a plurality of subframe periods. The computer readable medium may also include code for transmitting a first signal at a first transmit power during a first period. The computer readable medium may further include code for transmitting a second signal at a second transmit power during a second period. For example, the first transmit power and the second transmit power may be controlled based, at least in part, on a power level determined for the radio frame period.

Certain aspects of the present disclosure provide a computer readable medium for wireless communications, by a user equipment, on an SRFS band. The computer readable medium may include code for winning contention to the SRFS band for at least a portion of a radio frame period. For example, the radio frame period may include a plurality of subframe periods. The computer readable medium may also include code for transmitting a first signal at a first transmit power during a first subframe period of the radio frame period. The computer readable medium may further include code for transmitting a second signal at a second transmit power during a second subframe period of the radio frame period. For example, the first transmit power and the second transmit power may be controlled based, at least in part, on a power level determined for the radio frame period.

Certain aspects of the present disclosure provide a method for wireless communications on an SRFS band. The method may include winning contention to an SRFS band for a frame period. For example, the frame period may include a plurality of subframe periods. The method may also include transmitting a first signal at a first transmit power during a first subframe period of the plurality of subframe periods of the frame period. The method may further include transmitting a second signal at a second transmit power during a second subframe period of the plurality of subframe periods of the frame period. For example, the first transmit power and the second transmit power may be controlled based, at least in part, on a power level determined for the frame period.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
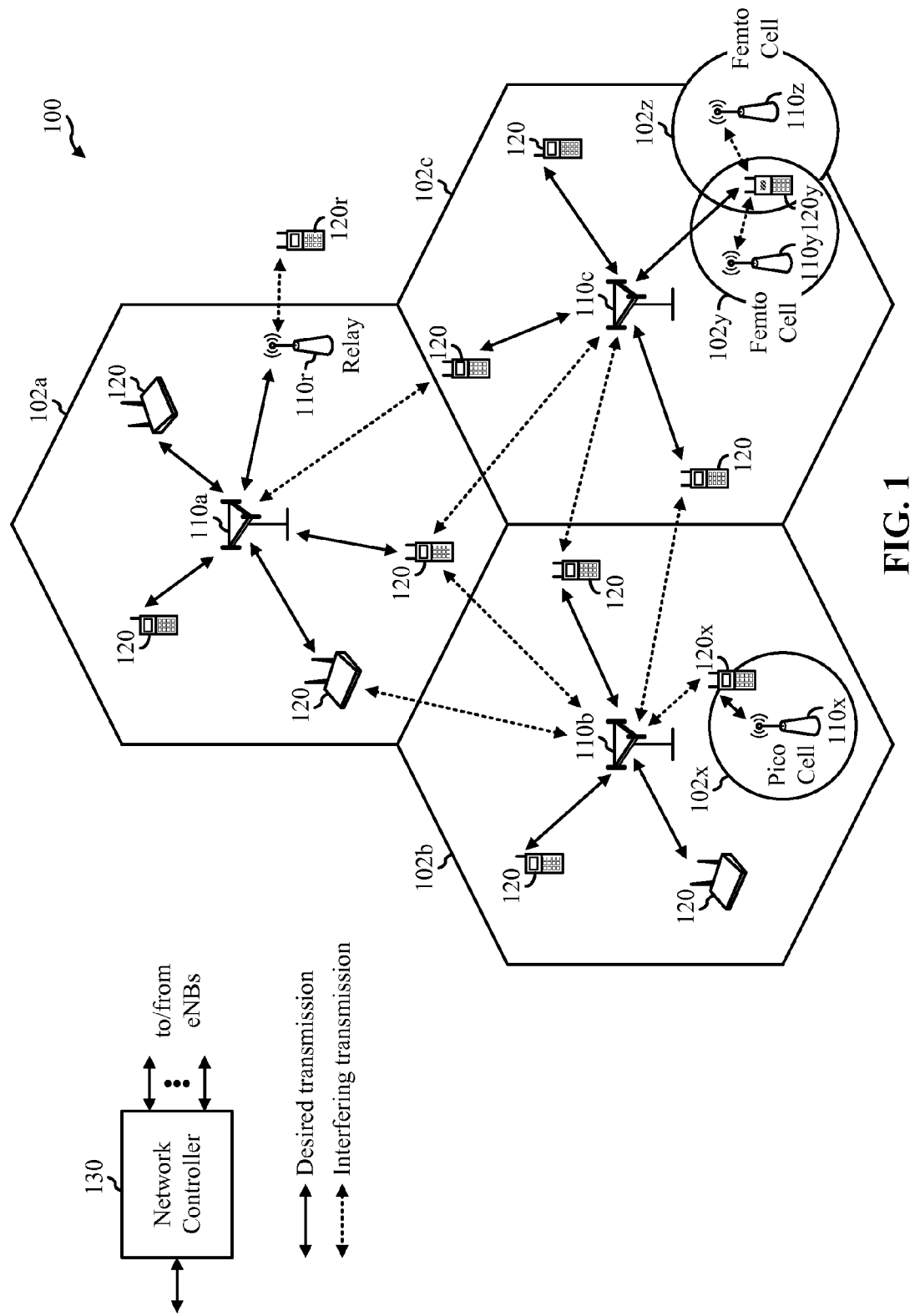
FIG. 1 is a block diagram conceptually illustrating an example of a telecommunications network system, in accordance with various aspects of the present disclosure.

Aspects of the disclosure provide techniques (e.g., methods, apparatuses, and systems) for controlling power of transmissions in a shared radio frequency spectrum (SRFS)

band. As used herein, an SRFS band may refer to an unlicensed radio frequency spectrum (URFS) band, for example, an RF spectrum band in which apparatuses contend for access because the RF spectrum band is available for unlicensed use, and/or an authorized shared access (ASA) radio frequency (RF) spectrum band, for example, an RF spectrum band that is available for shared access to a plurality of mobile network operators (MNOs). A licensed radio frequency spectrum (LRFS) band may refer to an RF spectrum band in which apparatuses do not need to contend for access because the RF spectrum band is available for licensed use and/or an RF spectrum band that is licensed for use to one or more MNOs.

In various aspects of the present disclosure, signals transmitted to and/or transmitted by the one or more UEs may experience interference from one or more other nodes that may transmit using the SRFS band. For example, the base station may not detect that a wireless local area network (WLAN) access point (AP) may be transmitting signals using a same portion of the SRFS band as the base station, which may cause interference with signals received at the UE(s). Such a WLAN AP may not be detected due to, for example, the WLAN AP being outside of an energy detection range of the base station, or due to the base station operating in a time division multiplexed manner with other base stations which may prevent the base station from detecting the interfering WLAN AP. In some examples, such an interfering node may be another base station that may be part of a different deployment than the base station serving the UE, and that the serving base station may not detect for similar reasons as mentioned above. Such an interfering WLAN AP or base station (or other interfering device transmitting using the SRFS band) may be referred to as a hidden node that is not detected by a serving base station.

According to various aspects of the present disclosure, transmit power of the base station and/or UE may be controlled in order to mitigate and/or eliminate the hidden node problem. For example, the transmit power of the base station and/or UE may be controlled across a plurality of subframes of a radio frame period in order to enable detection of the base station and/or UE by one or more hidden nodes. In an example, the transmission power of the base station and/or UE may be controlled to have the same transmission power across a plurality of subframes of a radio frame. In another example, a transmission power of a channel usage beacon signal (CUBS) transmitted by a base station may be controlled to mitigate and/or eliminate the hidden node problem. In other examples, a transmission power of a channel usage beacon signal (CUBS) transmitted by a UE may be controlled to mitigate and/or eliminate the hidden node problem.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Several aspects of telecommunications systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a block diagram conceptually illustrating an example of a telecommunications network system 100 in accordance with various aspects of the present disclosure. For example, the telecommunications network system 100 may be an LTE telecommunications network system. The telecommunications network system 100 may include a number of evolved NodeBs (eNodeBs) 110 and user equipment (UEs) 120 and other network entities, some or all of which may be capable of communicating using component carriers in an LRFS band and/or component carriers in an SRFS band, in accordance with various aspects of the present disclosure as described herein.

An eNodeB 110 may be a station that communicates with the UEs 120 and may also be referred to as a base station (BS), an AP, etc. A NodeB is another example of a station that communicates with the UEs 120.

Each eNodeB 110 may provide communication coverage for a particular geographic area. The term "cell" may refer to a coverage area of an eNodeB 110 and/or an eNodeB subsystem serving the coverage area, depending on the context in which the term is used. As will be described in greater detail below, some cells may operate using an LRFS band, while other cells may operate using an SRFS band.

An eNodeB 110 may provide communication coverage for a macro cell, a pico cell, a femto cell and/or other types of cells. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 may be subscribed to a Closed Subscriber Group (CSG), UEs 120 for users in the home, etc.). An eNodeB 110 for a macro cell may be referred to as a macro eNodeB. An eNodeB 110 for a pico cell may be referred to as a pico eNodeB. An eNodeB 110 for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB 110 may provide communication coverage for one or more (e.g., three) cells.

The telecommunications network system 100 may include one or more relay stations 110r and 120r, that may also be referred to as a relay eNodeB, a relay, etc. The relay station 110r may be a station that receives a transmission of data and/or other information from an upstream station (e.g., an eNodeB 110 or a UE 120) and sends the received transmission of the data and/or other information to a downstream station (e.g., a UE 120 or an eNodeB 110). The relay station 120r may be a UE that relays transmissions for other UEs (not shown). In the example shown in FIG. 1, the relay station 110r may communicate with the eNodeB 110a and the UE (e.g., relay station 120r) in order to facilitate communication between the eNodeB 110a and the UE.

The telecommunications network system 100 may be a heterogeneous network that includes eNodeBs 110 of different types, e.g., macro eNodeBs 110a-c, pico eNodeBs 110x, femto eNodeBs 110y-z, relay station 110r, etc. These different types of eNodeBs 110 may have different transmit power levels, different coverage areas, and different impact on interference in the telecommunications network system 100. For example, macro eNodeBs 110a-c may have a high transmit power level (e.g., 20 Watts) whereas pico eNodeBs 110x, femto eNodeBs 110y-z and relay station 110r may have a lower transmit power level (e.g., 1 Watt).

The telecommunications network system 100 may support synchronous or asynchronous operation. For synchronous operation, the eNodeBs 110 may have similar frame timing, and transmissions from different eNodeBs 110 may be approximately aligned in time (e.g., one or more subframe and/or frame boundaries of different eNodeBs 110 may be contemporaneously aligned). For asynchronous operation, the eNodeBs 110 may have different frame timing, and transmissions from different eNodeBs 110 may not be aligned in time (e.g., one or more subframe and/or frame boundaries of different eNodeBs 110 may not be contemporaneously aligned). The techniques described herein may be used to control transmission power for both synchronous and asynchronous operation.

A network controller 130 may be coupled to a set of eNodeBs 110 and provide coordination and control for these eNodeBs 110. The network controller 130 may communicate with the eNodeBs 110 via a backhaul (not shown). The eNodeBs 110 may also communicate with one another, e.g., directly or indirectly via wireless or wire line backhaul (e.g., X2 interface) (not shown).

The UEs 120 (e.g., 120x, 120y, etc.) may be dispersed throughout the telecommunications network system 100, and each UE 120 may be stationary or mobile. For example, the UE 120 may be referred to as a terminal, a mobile station, a subscriber unit, a station, etc. In another example, the UE 120 may be a cellular phone, a personal digital assistant (PDA), a wireless modem, a wireless communication device, a handheld device, a laptop computer, a cordless phone, a wireless local loop (WLL) station, a tablet, a netbook, a smart book, etc. The UE 120 may be able to communicate with macro eNodeBs 110a-c, pico eNodeB 110x, femto eNodeBs 110y-z, relay station 110r, etc. For example, in FIG. 1, a solid line with double arrows may indicate desired transmissions between a UE 120 and a serving eNodeB 110, which is an eNodeB 110 designated to serve the UE 120 on the downlink and/or uplink. A dashed line with double arrows may indicate interfering transmissions between a UE 120 and an eNodeB 110.

LTE may utilize orthogonal frequency division multiplexing (OFDM) on the downlink and single-carrier frequency division multiplexing (SC-FDM) on the uplink. OFDM and SC-FDM may partition the system bandwidth into multiple (K) orthogonal subcarriers, which are also commonly referred to as tones, bins, etc. Each subcarrier may be modulated with data. In general, modulation symbols may be sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10 or 20 megahertz (MHz), respectively. The system bandwidth may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

In some examples, the telecommunications network system 100 may support one or more modes of operation or deployment in an LRFS band (e.g., an RF spectrum band in which apparatuses do not need to contend for access because the RF spectrum band is licensed to particular users for particular uses) and/or an SRFS band (e.g., an RF spectrum band in which apparatuses contend for access because the RF spectrum band is available for shared use and/or an RF spectrum band that is available for shared access by a plurality of MNOs).

In some examples of the telecommunications network system 100, deployment scenarios may include a supplemental downlink mode or a licensed assisted access (LAA) mode in which LTE/LTE-A downlink communications in an LRFS may be offloaded to an SRFS, a carrier aggregation mode in which both downlink and uplink communications may be carried on aggregate component carriers of an LRFS band and/or an SRFS band, and a standalone mode in which downlink and uplink communications between a eNodeB and a UE may be using an SRFS band. The eNodeBs 110 as well as the UEs 120 may support one or more of these modes or similar modes of operation.

Figure 2:
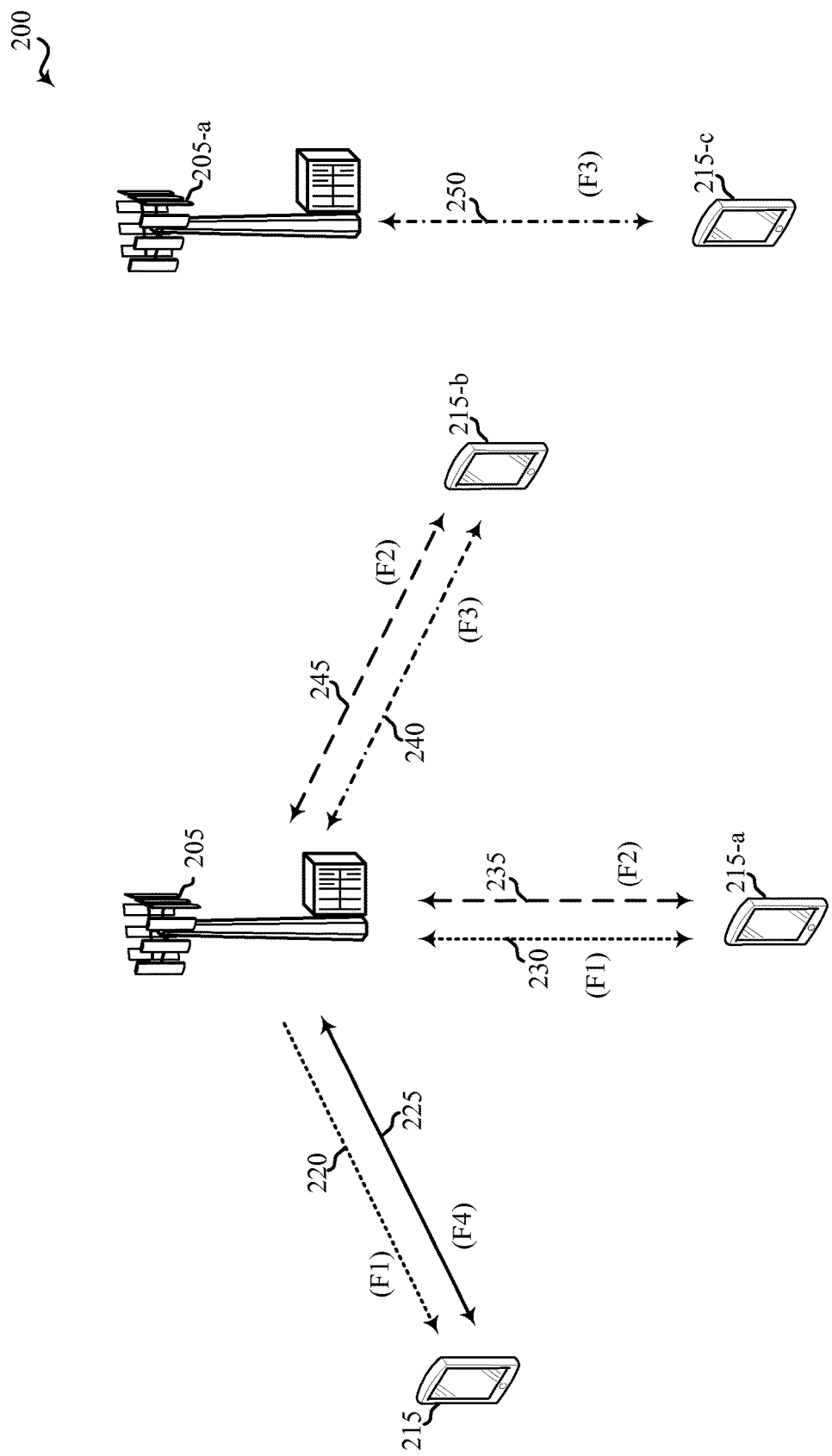
FIG. 2 is a block diagram conceptually illustrating different deployment scenarios for a wireless communication system using a shared radio frequency spectrum (SRFS) band, in accordance with various aspects of the present disclosure.

FIG. 2 shows a wireless communication system 200 in which LTE/LTE-A may be deployed under different scenarios using an SRFS band, in accordance with various aspects of the present disclosure. More specifically, FIG. 2 illustrates examples of a supplemental downlink mode (also referred to as LAA mode), a carrier aggregation mode, and a standalone mode in which LTE/LTE-A may be deployed using an SRFS band. The wireless communication system 200 may be an example of portions of the telecommunications network system 100 described with reference to FIG. 1. Moreover, a first BS 205 and a second BS 205-a may be examples of the BSs/eNodeBs 110 described with reference to FIG. 1, while a first UE 215, a second UE 215-a, a third UE 215-b, and a fourth UE 215-c may be examples of one or more of the UEs 120 described with reference to FIG. 1.

In the example of a supplemental downlink mode (or LAA mode) in the wireless communication system 200, the first BS 205 may transmit OFDMA waveforms to the first UE 215 using a downlink channel 220. The downlink channel 220 may be associated with a frequency F1 in an SRFS band. The first BS 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in an LRFS band. The downlink channel 220 in the SRFS band and the first bidirectional link 225 in the LRFS band may operate contemporaneously. The downlink channel 220 may provide a downlink capacity offload for the first BS 205. In some examples, the downlink channel 220 may be used for unicast services (e.g., addressed to one UE) or for multicast services (e.g., addressed to several UEs). This scenario may occur with any service provider (e.g., a MNO) that uses an LRFS band and needs to relieve some of the traffic or signaling congestion.

In one example of a carrier aggregation mode in the wireless communication system 200, the first BS 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the SRFS band. The first BS 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in an LRFS band. The second bidirectional link 230 may provide a downlink and uplink capacity offload for the first BS 205. Like the supplemental downlink mode (or LAA mode) described above, this scenario may occur with any service provider (e.g., MNO) that uses an LRFS band and needs to relieve some of the traffic or signaling congestion.

In another example of a carrier aggregation mode in the wireless communication system 200, the first BS 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the SRFS band. The first BS 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the LRFS band. The fourth bidirectional link 240 may provide a downlink and uplink capacity offload for the first BS 205. This example and those provided above are presented for illustrative purposes and there may be other similar modes of operation or deployment scenarios that combine LTE/LTE-A in an LRFS band and use an SRFS band for capacity offload.

As described above, one type of service provider that may benefit from the capacity offload offered by using LTE/LTE-A in an SRFS band is a traditional MNO having access rights to an LTE/LTE-A LRFS band. For these service providers, an operational example may include a bootstrapped mode (e.g., supplemental downlink mode (LAA mode, carrier aggregation mode) that uses the LTE/LTE-A primary component carrier (PCC) on the LRFS band and at least one secondary component carrier (SCC) on the SRFS band.

In the carrier aggregation mode, data and control may, for example, be communicated in the LRFS band (e.g., via first bidirectional link 225, third bidirectional link 235, and fifth bidirectional link 245) while data may, for example, be communicated in the SRFS band (e.g., via second bidirectional link 230 and fourth bidirectional link 240). The carrier aggregation mechanisms supported when using an SRFS band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second BS 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the SRFS band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to an LRFS band.

Figure 3:
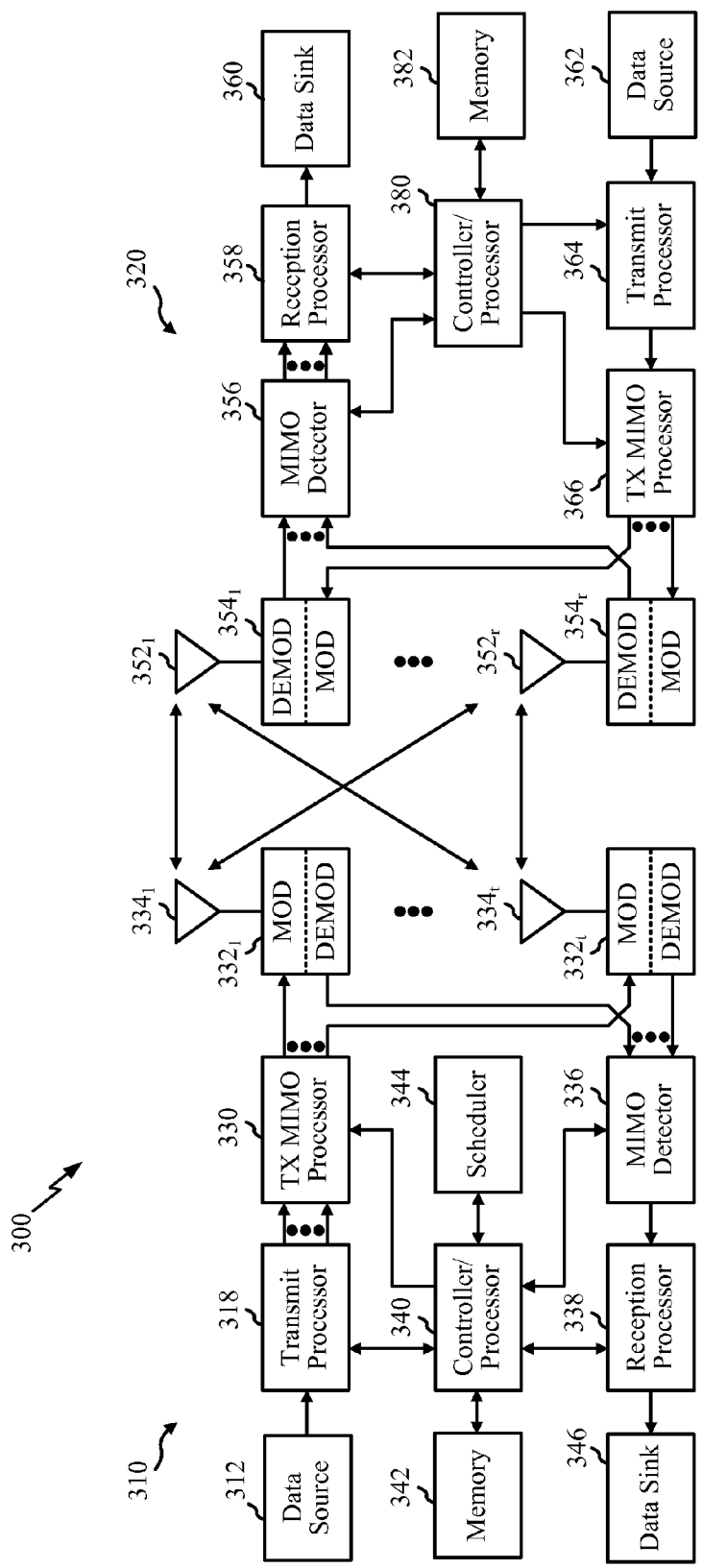
FIG. 3 is a block diagram conceptually illustrating an example eNodeB and an example UE configured in accordance with various aspects of the present disclosure.

FIG. 3 is a block diagram conceptually illustrating an example of a telecommunications network system 300 in which an example BS/eNodeB 310 and an example UE 320 may be configured to communicate using an LRFS band and/or an SRFS band, in accordance with various aspects of the present disclosure. The telecommunications network system 300 may be an example of portions of the telecommunications network system 100 described with reference to FIG. 1. For example, the BS/eNodeB 310 and the UE 320, as shown in FIG. 3, may be one of the BSs/eNodeBs 110 and one of the UEs 120 in FIG. 1. The BS/eNodeB 310 may be equipped with antennas $334_{1-t}$, and the UE 320 may be equipped with antennas $352_{1-r}$, wherein t and r are integers greater than or equal to one.

At the BS/eNodeB 310, a BS transmit processor 318 may receive data from a BS data source 312 and control information from a BS controller/processor 340. The control information may be carried on the PBCH, PCFICH, PHICH, PDCCH, etc. The data may be carried on the PDSCH, etc. The BS transmit processor 318 may process (e.g., encode and symbol map) the data and control information to obtain data symbols and control symbols, respectively. The BS transmit processor 318 may also generate reference symbols, e.g., for the PSS, SSS, and cell-specific reference signal (RS). A BS transmit (TX) multiple-input multiple-output (MIMO) processor 330 may perform spatial processing (e.g., precoding) on the data symbols, the control symbols, and/or the reference symbols, if applicable, and may provide output symbol streams to the BS modulators/demodulators (MODs/DEMODs) $332_{1-t}$. Each BS MOD/DEMOD 332 may process a respective output symbol stream (e.g., for OFDM, etc.) to obtain an output sample stream. Each BS MOD/DEMOD 332 may further process (e.g., convert to analog, amplify, filter, and upconvert) the output sample stream to obtain a downlink signal. Downlink signals from MODs/DEMODs $332_{1-t}$ may be transmitted via the antennas $334_{1-t}$, respectively.

At the UE 320, the UE antennas $352_{1-r}$, may receive the downlink signals from the BS/eNodeB 310 and may provide received signals to the UE MODs/DEMODs $354_{1-r}$, respectively. Each UE MOD/DEMOD 354 may condition (e.g., filter, amplify, downconvert, and digitize) a respective received signal to obtain input samples. Each UE MOD/DEMOD 354 may further process the input samples (e.g., for OFDM, etc.) to obtain received symbols. A UE MIMO detector 356 may obtain received symbols from all the UE MODs/DEMODs $354_{1-r}$, and perform MIMO detection on the received symbols if applicable, and provide detected symbols. A UE reception processor 358 may process (e.g., demodulate, de-interleave, and decode) the detected symbols, provide decoded data for the UE 320 to a UE data sink 360, and provide decoded control information to a UE controller/processor 380.

On the uplink, at the UE 320, a UE transmit processor 364 may receive and process data (e.g., for the physical uplink shared channel (PUSCH)) from a UE data source 362 and control information (e.g., for the PUCCH) from the UE controller/processor 380. The UE transmit processor 364 may also generate reference symbols for a reference signal. The symbols from the UE transmit processor 364 may be precoded by a UE TX MIMO processor 366 if applicable, further processed by the UE MODs/DEMODs $354_{1-r}$ (e.g., for SC-FDM, etc.), and transmitted to the BS/eNodeB 310. At the BS/eNodeB 310, the uplink signals from the UE 320 may be received by the BS antennas 334, processed by the BS MODs/DEMODs 332, detected by a BS MIMO detector 336 if applicable, and further processed by a BS reception processor 338 to obtain decoded data and control information sent by the UE 320. The BS reception processor 338 may provide the decoded data to a BS data sink 346 and the decoded control information to the BS controller/processor 340.

The BS controller/processor 340 and the UE controller/processor 380 may direct the operation at the BS/eNodeB 310 and the UE 320, respectively. The BS controller/processor 340 and/or other processors and modules at the BS/eNodeB 310 may perform or direct, e.g., the execution of the functional blocks of the flowcharts illustrated in FIGS. 5 and 6, and/or other processes for the techniques described herein. The UE controller/processor 380 and/or other processors and modules at the UE 320 may also perform or direct, e.g., the execution of the functional blocks of the flowcharts illustrated in FIGS. 7, 11 and 13, and/or other processes for the techniques described herein. The BS memory 342 and the UE memory 382 may store data and program codes for the BS/eNodeB 310 and the UE 320, respectively. A BS scheduler 344 may schedule UEs 320 for data transmission on the downlink and/or uplink.

In some cases, when communicating via an SRFS band, a network node (e.g., UE or BS) may perform a listen before talk (LBT) procedure in order to win contention-based access to the SRFS band. The LBT procedure may refer to monitoring (listening) to determine whether another network node is occupying the same RF band before communicating (talking) on the RF band in order to avoid interference. A BS may perform a downlink LBT (D-LBT) procedure before communicating on the downlink, while a UE may perform an uplink LBT (U-LBT) procedure before communicating on the uplink.

Figure 4A:
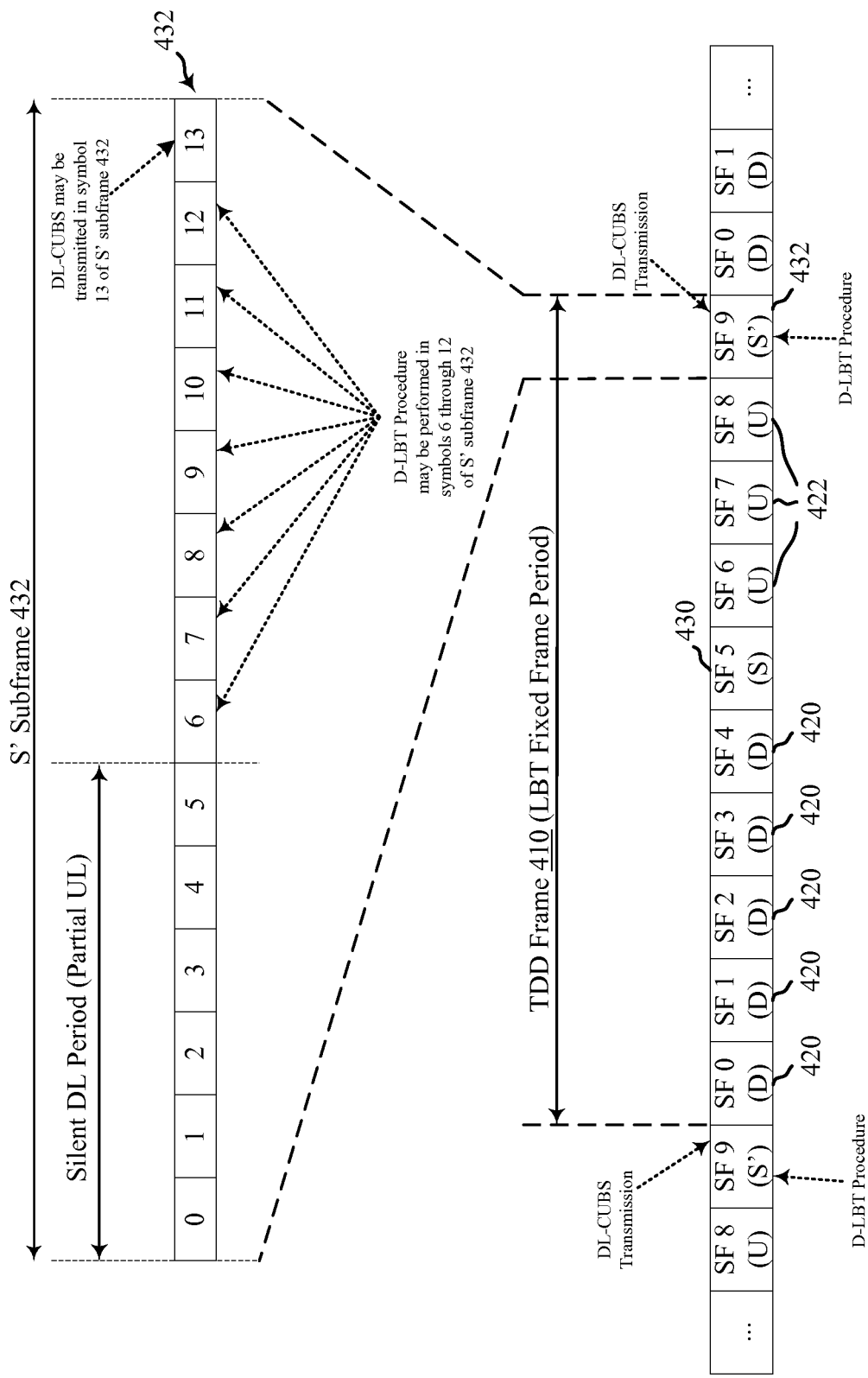
FIG. 4A illustrates an example frame structure used for a downlink listen-before-talk (D-LBT) procedure in an SRFS band, in accordance with various aspects of the present disclosure.

FIG. 4A illustrates an example frame structure that may be used to illustrate a D-LBT procedure in an SRFS band in accordance with various aspects of the present disclosure. A frame 410, which may correspond to an LBT fixed frame period (which may refer to a duration that an entity has won contention and occupies/reserves the SRFS band), may have a duration of 10 milliseconds. As illustrated, the frame 410 may include a number of downlink subframes 420, a number of uplink subframes 422, and two types of special subframes, an S subframe 430 and an S' subframe 432.

The S subframe 430 may provide a transition between downlink subframes 420 and uplink subframes 422, while the S' subframe 432 may provide a transition between uplink subframes 422 and downlink subframes 420. As shown, during the S' subframe 432, a D-LBT procedure may be performed by one or more BSs, such as one or more of the eNodeBs 110 described with reference to FIG. 1, to determine whether another network node is occupying the SRFS band. If it is determined that another network node is not occupying the SRFS band, the BS may reserve the SRFS band for a period of time for communication. For example, as shown, following a successful D-LBT procedure (e.g., winning contention to access the SRFS band), the BS may transmit a downlink channel usage beacon signal (DL-CUBS) to provide an indication to other network nodes and/or apparatuses that the BS has occupied/reserved the SRFS band.

As illustrated, the S' subframe 432 may include 14 OFDM symbols, numbered 0 through 13. A first portion of the S' subframe 432, symbols 0 through 5 in this example, may be used by BSs as a silent DL period, which may be used for compatibility purposes with certain standards (e.g., LTE/LTE-A). Thus, a BS may not transmit data during the silent DL period, although a UE may transmit some amount of uplink data during the silent DL period.

A second portion of the S' subframe 432, symbols 6 through 12 in this example, may be used for a D-LBT procedure. In the illustrated example, the S' subframe 432 includes seven symbols to serve as D-LBT slots, symbols 6 through 12. Use of different D-LBT symbols by different network operators may be coordinated to provide more efficient system operation. In some examples, in order to determine which of the seven possible D-LBT symbols to use to perform a D-LBT procedure, an eNodeB 110 may evaluate a mapping-function of the form:

$$F_D(\text{GroupID}, t) \in \{1,2,3,4,5,6,7\}$$

where GroupID is a "deployment group-id" assigned to the eNodeB 110, and t is the LBT frame number corresponding to a frame for which D-LBT is performed. Assigning D-LBT symbols in this manner may help ensure different BSs have a fair opportunity to gain access to the channel. The last symbol of the S' subframe 432, symbol 13 in this example, may be used for a DL-CUBS transmission. For example, as mentioned above, following a successful D-LBT procedure (e.g., with no activity detected on the SRFS band in one of symbols 6 through 12 of the S' subframe 432), the BS may transmit a DL-CUBS in symbol 13 of the S' subframe 432 to provide an indication to other network nodes and/or apparatuses that the BS has occupied/reserved the SRFS band.

Figure 4B:
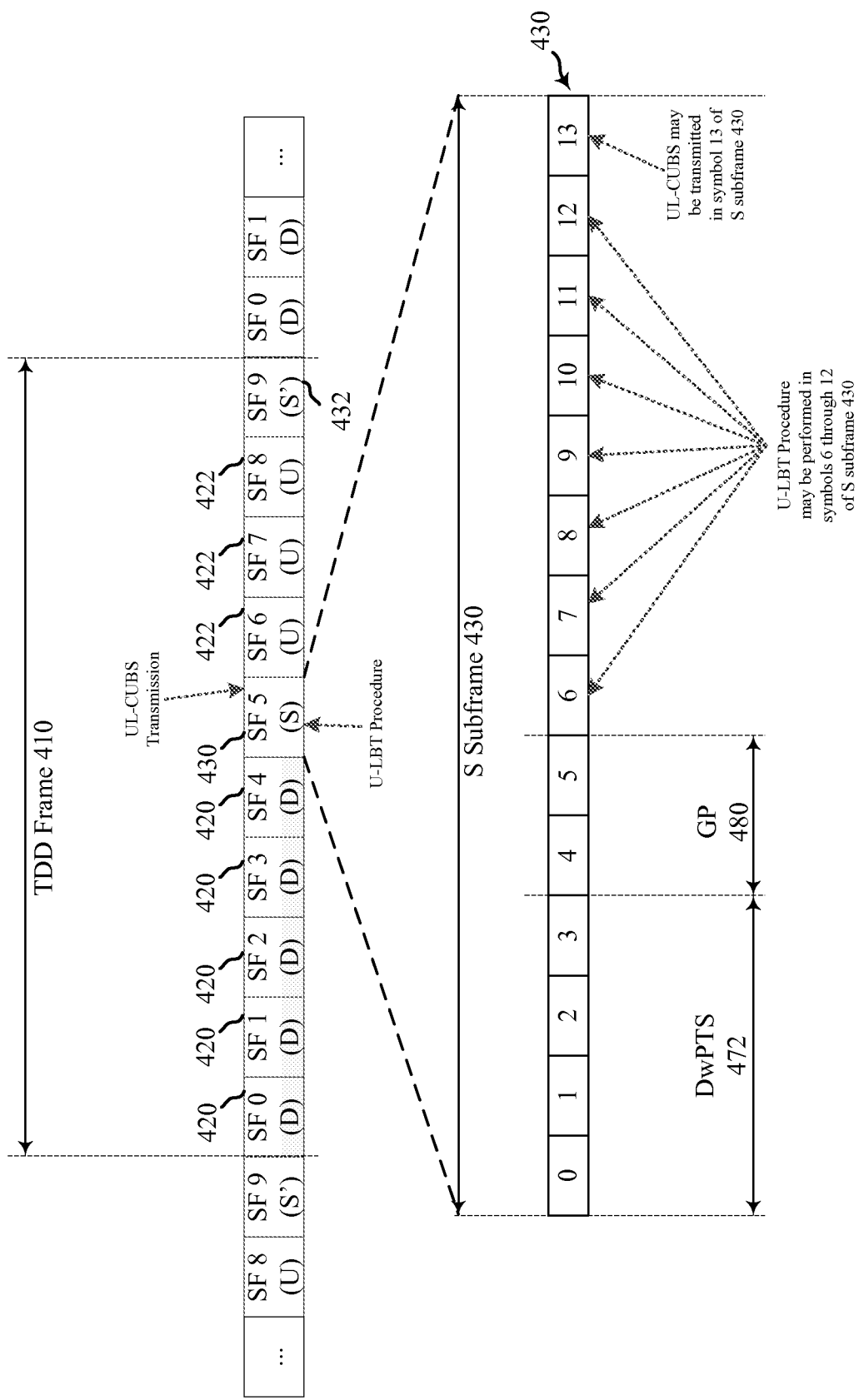
FIG. 4B illustrates an example frame structure used for an uplink listen-before-talk (U-LBT) procedure in an SRFS band, in accordance with various aspects of the present disclosure.

FIG. 4B illustrates an example frame structure that may be used to illustrate a U-LBT procedure in an SRFS band in accordance with various aspects of the present disclosure.

As discussed above, frame 410 may include an S subframe 430 that provides a transition between downlink subframes 420 and uplink subframes 422, while the S' subframe 432 may provide a transition between uplink subframes 422 and downlink subframes 420.

As illustrated in FIG. 4B, during the S subframe 430, a U-LBT procedure may be performed by one or more UEs, such as one or more of the UEs 120 and 320 described above with reference to FIGS. 1 and 3, to reserve, for a period of time, the SRFS band over which the wireless communication occurs. Following a successful U-LBT procedure by a UE, the UE may transmit a UL-CUBS to provide an indication to other UEs and/or apparatuses that the UE has occupied/reserved the SRFS band.

As illustrated, the S subframe 430 may include 14 OFDM symbols, numbered 0 through 13. A first portion of the S subframe 430, symbols 0 through 3 in this example, may be used as a downlink pilot time slot (DwPTS) 472, and a second portion of the S subframe 430, symbols 4 and 5 in this example, may be used as a guard period (GP) 480. A third portion of the S subframe 430, symbols 6 through 12 in this example, may be used for a U-LBT procedure. In the illustrated example, the S subframe 430 includes seven U-LBT symbols, included in symbols 6 through 12. Just as use of different D-LBT symbols shown in FIG. 4A may be used by different BSs, use of different U-LBT symbols by different UEs may be coordinated to provide more efficient system operation. In some examples, in order to determine which of the seven possible U-LBT symbols to use to perform a U-LBT procedure, a UE may evaluate a mapping-function of the form:

$$F_U(\text{GroupID}, t) \in \{1,2,3,4,5,6,7\}$$

where GroupID is a "deployment group-id" assigned to the UE, and t is the LBT frame number corresponding to a frame for which U-LBT is performed. The last symbol of the S subframe 430, again symbol 13 in this example, may be used for a UL-CUBS transmission. For example, as mentioned above, following a successful U-LBT procedure (e.g., with no activity detected on the SRFS band in one of symbols 6 through 12 of the S subframe 430), the UE may transmit a UL-CUBS in symbol 13 of the S subframe 430 to provide an indication to other UEs and/or apparatuses that the UE has occupied/reserved the SRFS band.

The mapping function for D-LBT and/or U-LBT may be constructed based on different criteria, for example, depending on whether the mapping function will have an orthogonalization or a non-orthogonalization property. In examples with orthogonal LBT access, the mapping function may have an orthogonalization property according to:

$$F_{D/U}(x, t) \neq F_{D/U}(y, t)$$

GroupID x, y $\in \{1,2,3,4,5,6,7\}$ for all time t, whenever x≠y represent different group-ids. In this case, BSs and/or UEs with different group-ids may perform LBT procedures during non-overlapping LBT time intervals. In the absence of interference, the BS or UE with the group-id which maps to an earlier LBT time slot may secure the channel for a period of time. According to various deployments, the mapping-function is fair, in the sense that across different time indices t, the mapping $\{F_{D/U}(x, t), t=1, 2, 3, \ldots\}$ varies such that different group-ids have an equal chance of mapping to an earlier LBT time slot (and hence secure the channel in the absence of other interference) over a suitably long interval of time.

In some cases, all BSs and UEs deployed by the same network operator (service-provider) may be assigned the same group-id, so that they do not preempt each other in the contention process. This may allow for full frequency reuse among BSs and UEs of the same deployment, leading to enhanced system throughput. BSs and/or UEs of different deployments may be assigned different group-ids, so that with orthogonal LBT slot mapping, access to the channel is mutually exclusive.

In examples with non-orthogonal, or overlapping, LBT slot access, the mapping function may allow for more than seven group ids. In some situations, for example, it may be useful to support more than seven deployment group-ids, in which case it is not possible to maintain the orthogonality property of LBT slot mapping functions. In such cases, it may be desirable to reduce the frequency of collision between any two group-ids. In some examples, non-orthogonal LBT slot mapping sequences may also be used to provide fair channel sharing among deployments without tight coordination on LBT opportunities. One example of a non-orthogonal LBT slot mapping sequence is given by:

$$F_{D/U}(x, t) = R_{1,7}(x, t)$$

GroupID $x \in \{1, 2, \ldots 2^{16}\}$ where $R_{1,7}(x,t)$ is a pseudo-random number generator between 1 and 7 chosen independently for GroupID x. In this case, there could be potential collisions between BSs and/or UEs of different GroupIDs in the same LBT frame t.

Some modes of communication with a UE may utilize a plurality of channels (i.e., component carriers), with each channel being established between the UE and one of a number of cells using different component carriers (e.g., serving cells, which in some cases may be different BSs). In some examples, two or more cells may use different carrier frequencies or component carriers, as might be found in a carrier aggregation and/or dual-connectivity (e.g., multi-flow) mode of communication. In other examples, two or more cells may be of a same carrier frequency, as might be found in a coordinated multipoint (CoMP) mode of communication. Regardless, each component carrier may be used over LRFS or SRFS, and a set of component carriers involved in a particular mode of communication may all be received over (potentially contention free) LRFS, all be received over (contention-based) SRFS, or be received over a combination of LRFS and SRFS.

As described above, to establish communication using a component carrier over SRFS, an LBT procedure (U-LBT or D-LBT) may be performed to contend for access to the SRFS. When the LBT procedure is successful, the component carrier may be used for communication in the SRFS. When the LBT procedure fails, the component carrier may not be used.

The telecommunications network systems (e.g., illustrated in FIGS. 1 and 3) may also support one or more power control techniques. For example, in a LTE network, power control may be performed for both downlink/uplink directions and on a per subframe basis. In some cases, for downlink power control, downlink power control techniques may include the serving BS/eNodeB broadcasting total transmit power to the UE via system information (e.g., in a system information block (SIB1)) signaled to the UE. The UE may use the information received in the SIB1 to perform one or more measurements, including received signal strength, received signal quality, path loss, etc. Other examples of downlink power control techniques include power boosting the energy per resource element (EPRE) for CRS transmissions, utilizing a fixed traffic to pilot power ratio (TPR) for PDSCH, etc. In one example, TPR may be fixed for high modulation orders (e.g., 16 QAM and above) for CRS based PDSCH and may be fixed for demodulation reference signal (DM-RS) based PDSCH.

For uplink power control, LTE, for example, may support both open-loop and close-loop based methods. For PUSCH power control, both accumulative and absolute power control modes may be supported. For PUCCH power control, the accumulative power control may be supported. In some cases, the power control for sounding reference signal (SRS) may be correlated to PUSCH. However, in this case, the SRS power control may account for a power offset between SRS and PUSCH, bandwidth difference and other factors. In some cases, the UE may be configured via higher layers for the particular power control mode that is to be used.

As mentioned above, techniques such as LBT may be utilized in telecommunications network systems utilizing SRFS bands in order to win contention to gain access to the SRFS band. These techniques, however, may present challenges for controlling power of transmissions sent in SRFS bands, such as CUBS transmissions.

According to aspects, various techniques are provided herein that may allow for controlling the transmission power of transmissions in an SRFS band from one or more apparatuses (e.g., UEs, BSs/eNodeBs, relays, etc.) in the telecommunications network systems (e.g., telecommunications network systems 100 and 300 illustrated in FIGS. 1 and 3).

Figure 5:
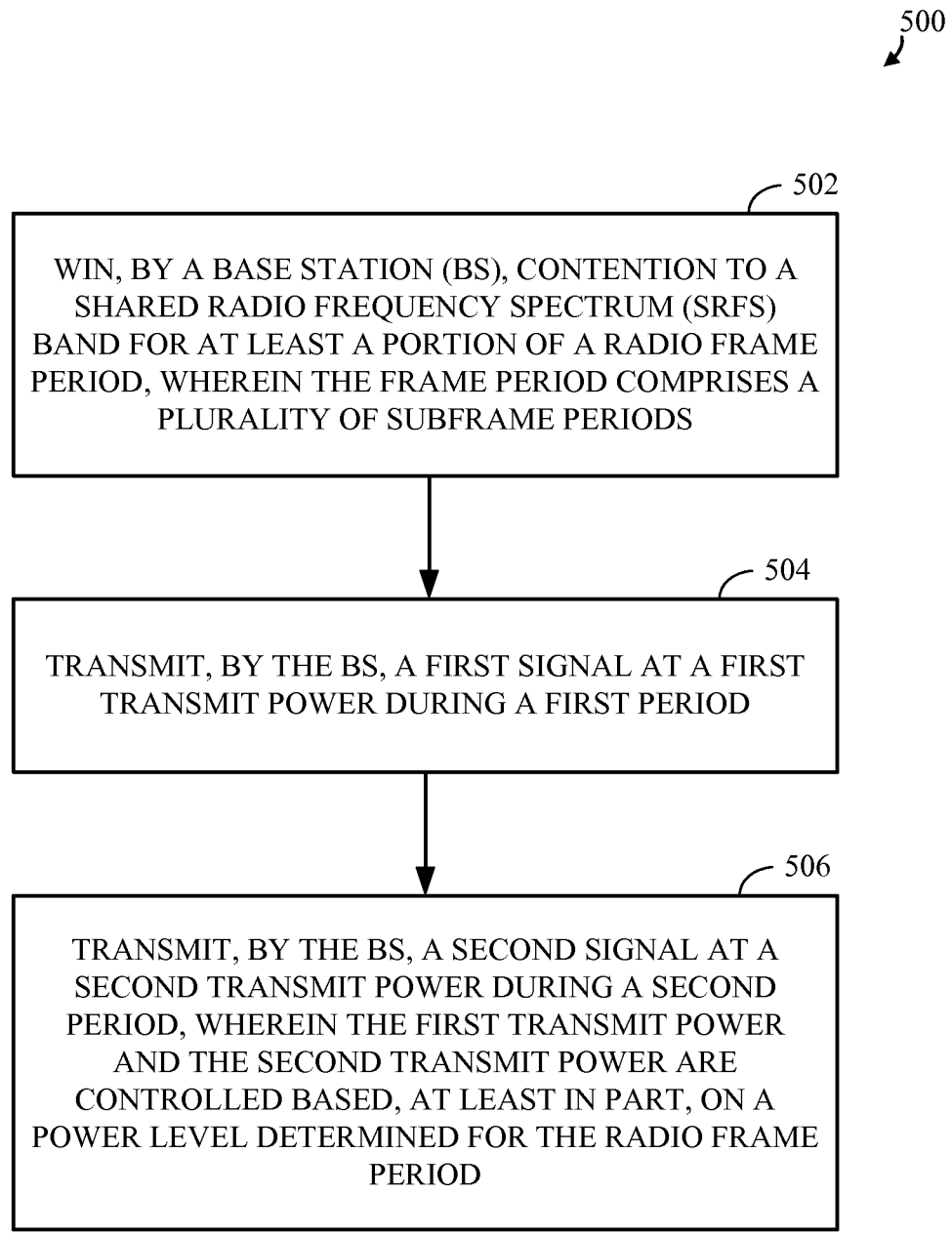
FIG. 5 illustrates an example flowchart for wireless communications by a base station, in accordance with various aspects of the present disclosure.
Figure 6:
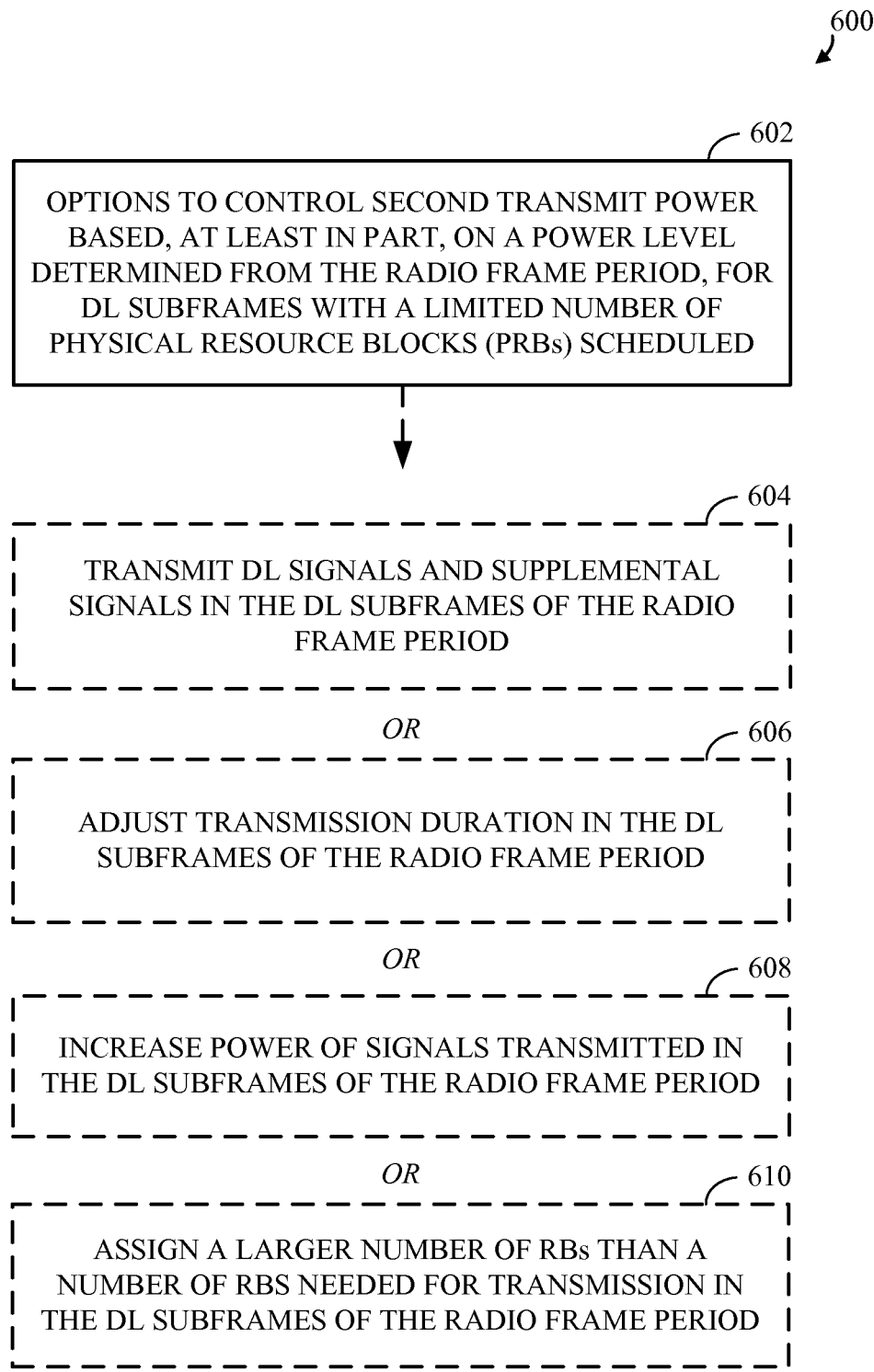
FIG. 6 illustrates an example flowchart for wireless communications by a base station, in accordance with various aspects of the present disclosure.
Figure 14:
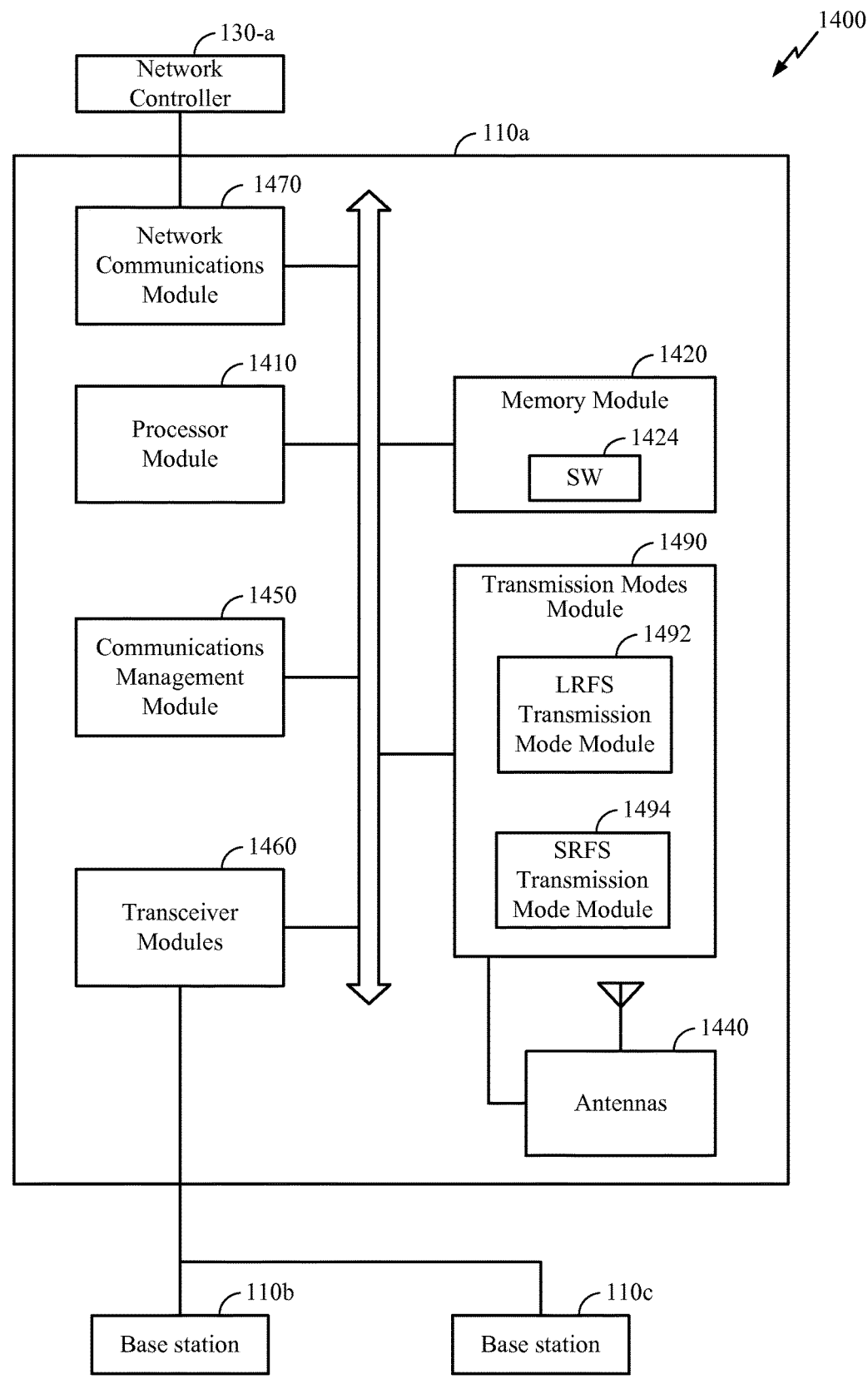
FIG. 14 is a block diagram conceptually illustrating an example base station, in accordance with various aspects of the present disclosure.

FIGS. 5 and 6 illustrate example flowcharts 500 and 600, respectively, for wireless communications that may be performed, for example, by a BS (e.g., BSs/eNodeBs 110 as shown in FIGS. 1 and 14, BS/eNodeB 310 as shown in FIG. 3, etc.) in telecommunications network systems utilizing LRFS and/or SRFS band(s), in accordance with various aspects of the present disclosure.

Referring first to FIG. 5, the flowchart 500 begins, at 502, with the BS winning contention to the SRFS band for at least a portion of a radio frame period, wherein the radio frame period comprises a plurality of subframe periods. At 504, the BS may transmit a first signal at a first transmit power during a first period. At 506, the BS may transmit a second signal at a second transmit power during a second period, wherein the first transmit power and the second transmit power are controlled based, at least in part, on a power level determined for the radio frame period.

According to certain aspects of the present disclosure, referring again to FIGS. 4A and 4B, the transmission power during the first downlink subframe (SF 0) 420 of the frame 410 and the transmission power during the second downlink subframe (SF 1) of the frame 410 may be controlled by a power level determined for the frame 410.

For example, the transmission power during the first downlink subframe (SF 0) 420 and the transmission power during the second downlink subframe (SF 1) 420 may be equal to the power level determined for the frame 410. In another example, the transmission power during all downlink subframes (e.g., SF 0, SF 1, SF 2, SF 3 and SF 4) 420 may be equal to the power level determined for the frame 410. In some cases, having the same transmission power across downlink subframes 420 in a frame 410 may help ensure consistent interference levels observed in different downlink subframes 420. In some cases, by having the same transmission power across downlink subframes 420, the interference to other nodes (e.g., different SRFS operators, whether they are synchronized or not synchronized with the frame 410 communicated over a cell) and/or other type of nodes (e.g., Wi-Fi nodes)) may be consistent as well.

In some cases, the power level for a frame may be determined based, at least in part, on a plurality of power control modes. For example, the plurality of power control modes may include a maximum power control mode, an adjustable power control mode and/or other types of power control modes. The power level for the frame may change dynamically from frame to frame. For example, a first frame may have a maximum power control mode and a second frame may have an adjustable power control mode.

According to certain aspects, the transmission power of a DL-CUBS may be controlled based, at least in part, on the power level determined for the frame. For example, the transmission power of the DL-CUBS may be equal to the power level determined for the frame. In another example, the transmission power of the DL-CUBS may be equal to the transmission power of one of the plurality of the downlink subframes of the frame. In another example, the transmission power of the DL-CUBS (e.g., transmitted in SF 9) and the transmission power during all downlink subframes (SF 0, SF 1, SF 2, SF 3 and SF 4) may be equal to the power level determined for the frame.

According to certain aspects of the present disclosure, the transmission power for DL-CUBS may be determined by system information (e.g., transmitted in a SIB1) signaled to the UE. For example, the system information (e.g., SIB1) may indicate a maximum power transmission for the DL-CUBS. The transmission power level for DL-CUBS (e.g., indicated in SIB1) may change over time (e.g., semi-statically). For example, the transmission power level for DL-CUBS, downlink subframes and/or frame may be dynamically changed from frame to frame (or changed less often in different SIB1s). For example, different BSs/eNodeBs may transmit at different transmission power levels for different frames.

Referring to block 602 of flowchart 600 in FIG. 6, if there are a limited number of physical resource blocks (PRBs) scheduled in a regular (non CUBS) DL subframe, there are various options to control transmit power in an effort to achieve consistent total power across different radio frames (e.g., when controlling transmit power per block 506 of FIG. 5). For example, as shown at 604, one technique for maintaining consistent transmission power level for DL subframes may be to supplement the downlink subframes with additional signals. In one case, the downlink subframes may be supplemented with channel occupancy signals (e.g., with no information) to fill up bandwidth (e.g., a bandwidth occupancy threshold requirement in the SRFS band).

Another technique for maintaining consistent transmission power for downlink subframes may be to vary the transmission duration of the downlink subframes. For example, at 606, the BS may adjust (e.g., decrease or increase) the transmission duration in the downlink subframes of the frame. In one example, the downlink subframes may be configured to have a shortened transmission duration (e.g., adjusting the transmission duration to a duration less than a subframe) when the transmission power of the downlink subframes is lower than the transmission power of the DL-CUBS and/or the power level determined for the frame. In another example, the downlink subframes may be configured to have a longer transmission duration (e.g., adjusting the transmission duration to a duration longer than a subframe) when the transmission power of the downlink subframes is higher than the transmission power of the DL-CUBs and/or the power level determined for the frame.

Another technique for maintaining consistent transmission power for downlink subframes may be to increase the transmission power of the downlink subframes as shown at 608. For example, the transmission power of the downlink subframes may be increased to be consistent with the transmission power of the DL-CUBS and/or the power level determined for the frame (e.g., using an increased power to compensate for the limited number of PRBs).

Another technique for maintaining consistent transmission power for downlink subframes may be to assign more resource blocks (RBs) for the downlink subframes than actually needed, as shown at 610. In one example, a larger number of RBs (e.g., than actually needed) may be assigned to the downlink subframes if the transmission power of the downlink subframes is lower than the transmission power of the DL-CUBS and/or the power level determined for the frame. In some cases, transport block size (TBS) may still be determined conventionally (e.g., per LTE/LTE-A network), however it may be necessary to have zero-padding bits to utilize the increased number of RBs. As an alternative, in some cases, TBS may be scaled down when an increased number of RBs is assigned (which may eliminate the need for zero-padding).

Various techniques described above may be combined to maintain consistent transmission power for downlink subframes with the transmission power of DL-CUBS and/or the power level determined for the frame. For example, in one case, power increasing (per block 608) and assigning various numbers of RBs (per block 610) may be combined to maintain consistent transmission power for downlink subframes.

Figure 7:
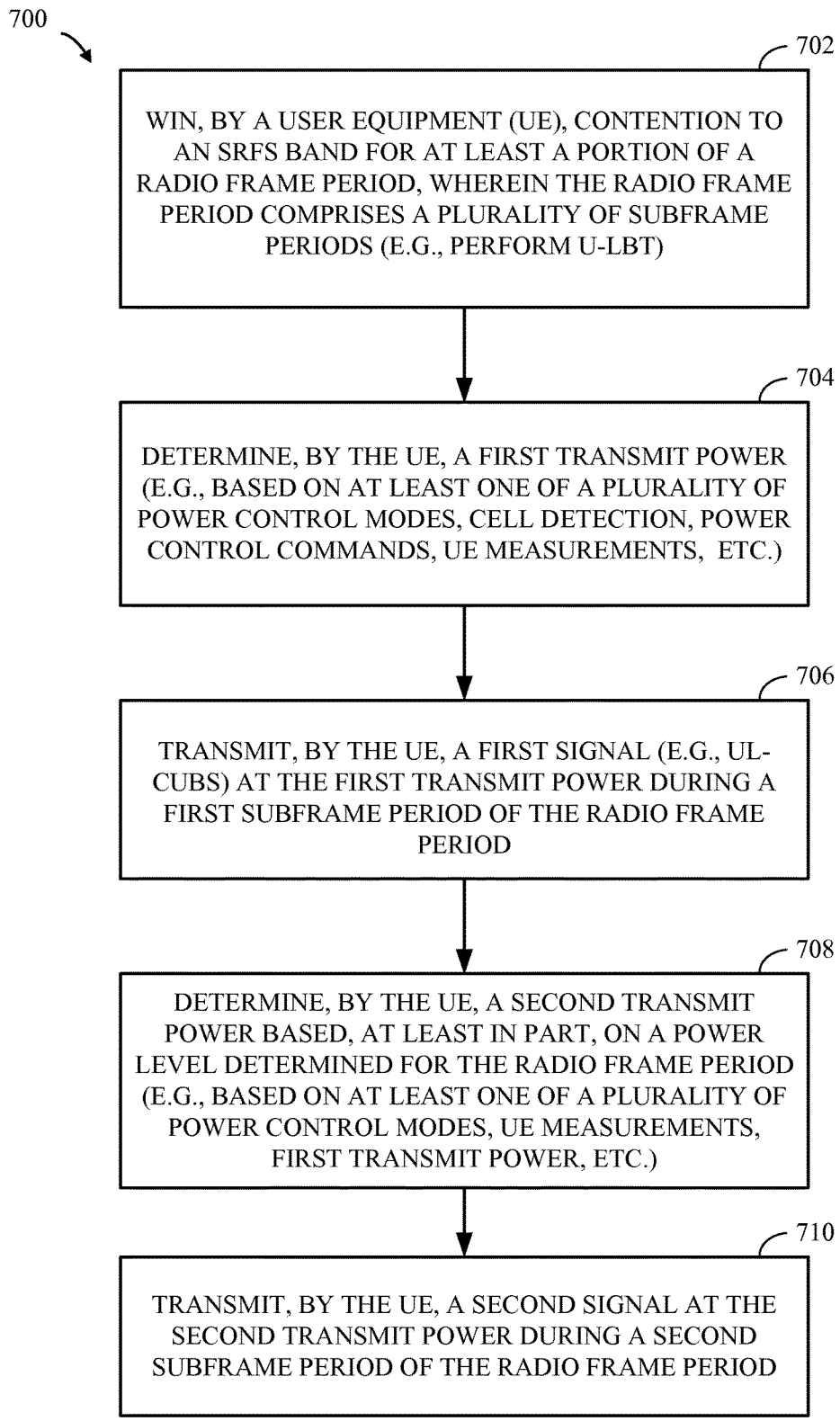
FIG. 7 illustrates an example flowchart for wireless communications by a user equipment, in accordance with various aspects of the present disclosure.
Figure 15:
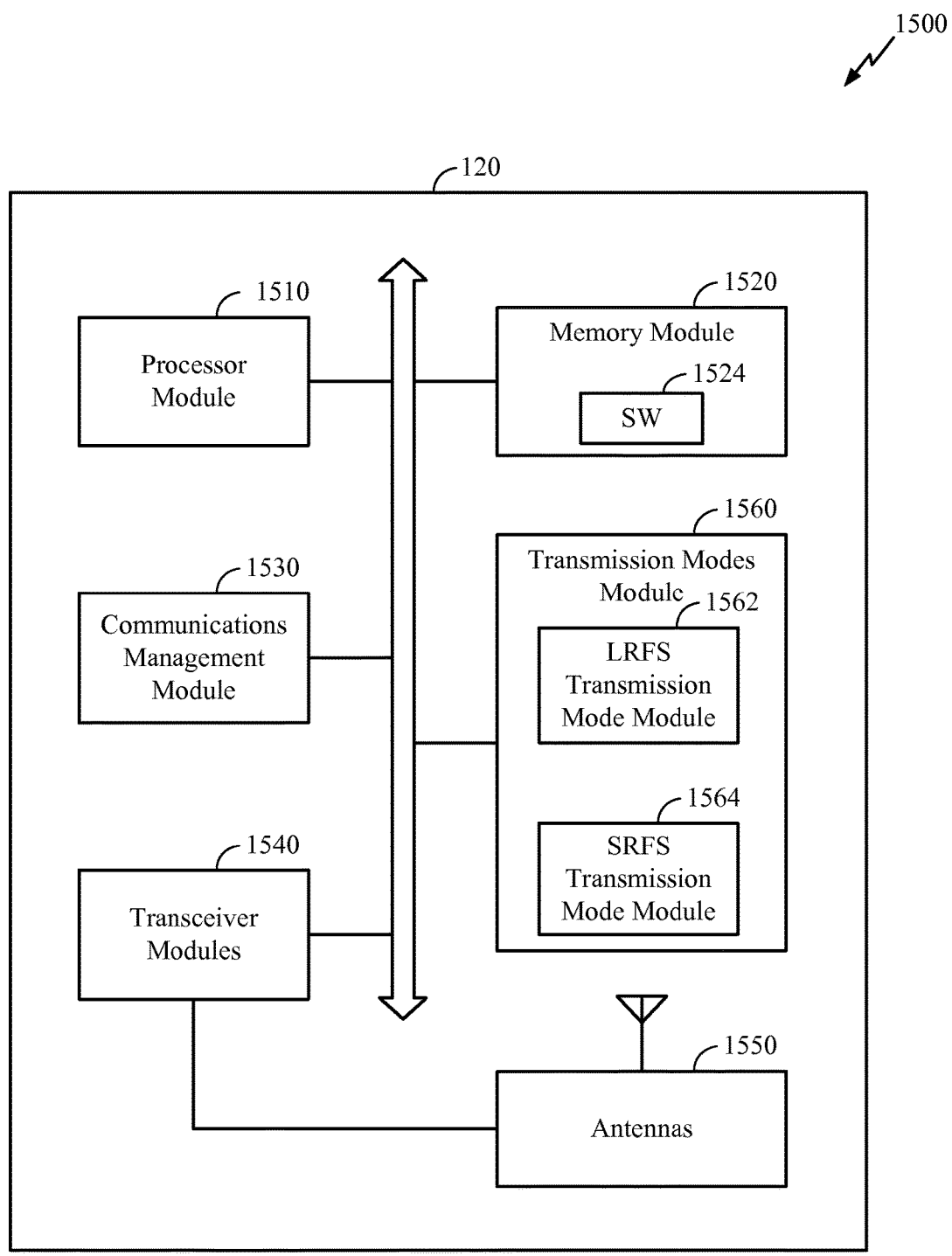
FIG. 15 is a block diagram conceptually illustrating an example user equipment, in accordance with various aspects of the present disclosure.

FIG. 7 illustrates an example flowchart 700 for wireless communications that may be performed, for example, by a UE (e.g., a UE 120 as shown in FIGS. 1 and 15, UE 320 as shown in FIG. 3, etc.) in a network using an LRFS and/or an SRFS band(s), in accordance with various aspects of the present disclosure. The flowchart 700 is similar to flowchart 500 performed by a BS for D-LBT operations, but may be performed by a UE for U-LBT operations.

At 702, the UE wins contention to the SRFS band for at least a portion of a radio frame period, wherein the radio frame period comprises a plurality of subframe periods. For example, as described above, in one example, the UE, at 702, may perform a U-LBT procedure (e.g., in one of symbols 6 through 12 of the S subframe) to determine whether there is any activity on the SRFS band.

At 704, the UE may determine a first transmit power for a first signal. For example, as will be described in further detail below, the first transmit power may be determined based on at least one of a plurality of power control modes, cell detection/discovery, power control commands, measurements by the UE, etc. At 706, the UE may then transmit the first signal at the first transmit power during a first subframe period of the radio frame period. For example, as described herein, the first signal may be a UL-CUBS transmitted by the UE in symbol 13 of the S subframe.

At 708, the UE may determine a second transmit power for a second signal based, at least in part, on a power level determined for the radio frame period. For example, as will also be described in more detail below, the UE may determine the second transmit power based on at least one of a plurality of power control modes, measurements by the UE, first transmit power, etc. At 710, the UE may transmit the second signal at the second transmit power during a second subframe period of the radio frame period.

According to certain aspects of the present disclosure, e.g., referring to frame 410 illustrated in FIG. 4B, the uplink transmission power (e.g., transmission power for a UL-CUBS transmitted in SF 5 and/or transmission power for uplink subframes 422) may be controlled based, at least in part, on a plurality of power control modes (e.g., a maximum power control mode, an adjustable power control mode, and/or other types of power control modes). For example, a power control mode may be determined from a plurality of power control modes based at least in part on channel conditions, interference conditions and/or various deployment scenarios. The power control mode may be configured on a cell basis. For example, different cells may be configured with different power control modes. In another example, the power control mode may be configured on a UE basis. For example, different UEs may be configured with different power control modes. The power control mode configuration for the cell and/or the UE may be adjusted over time. For example, the power control modes may be semi-statically adjusted or dynamically adjusted.

Figure 8:
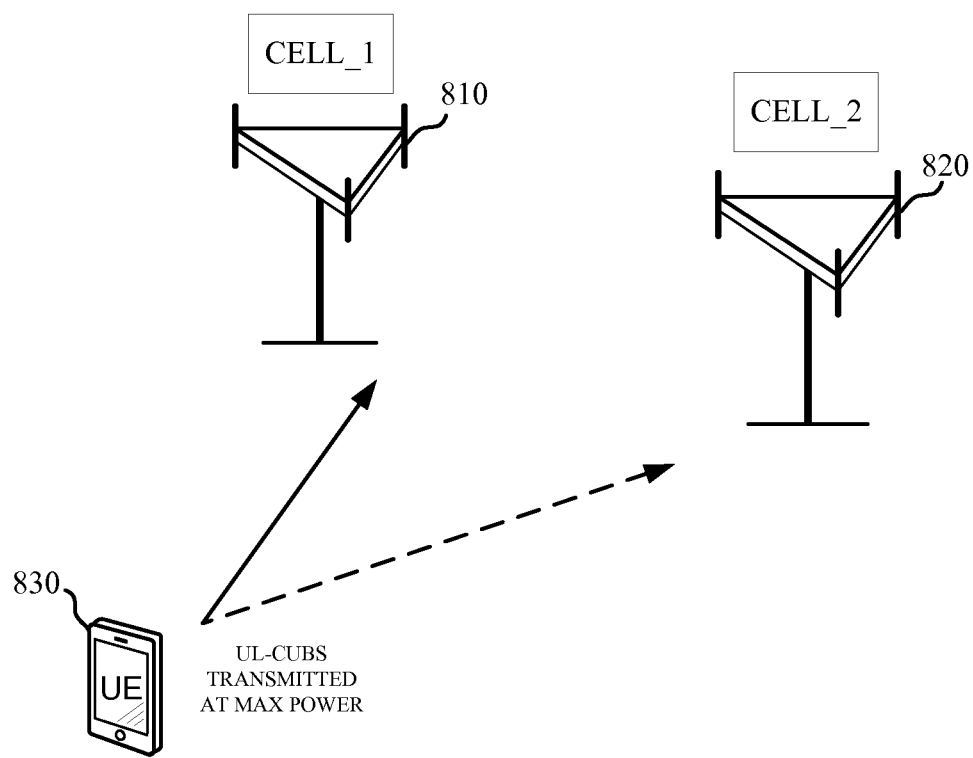
FIG. 8 illustrates an example scenario for controlling transmission power of an uplink channel usage beacon signal (UL-CUBS), in accordance with various aspects of the present disclosure.

FIGS. 8-10 illustrate example scenarios for controlling the transmission power of UL-CUBS (e.g., based on the different power control modes discussed below) from a UE, in accordance with various aspects of the present disclosure. The UEs 830, 930 and 1030 illustrated in FIGS. 8-10, respectively, may be any of the UEs 120 shown in FIGS. 1 and 15, UE 320 shown in FIG. 3, etc. Similarly, the BSs for Cell_1 (e.g., Cell_1 810, Cell_1 910 and Cell_1 1010) and the Cell_2 (e.g., Cell_2 820, Cell_2 920 and Cell_2 1020) illustrated in FIGS. 8-10 may be any of the BSs/eNodeBs 110 shown in FIGS. 1 and 14, BS/eNodeB 310 shown in FIG. 3, etc.

Referring first to FIG. 8, the UE 830 may transmit a UL-CUBS to indicate to other UEs and/or apparatuses (such as Cell_1 810 and Cell_2 820) that the UE won contention and will occupy/reserve the SRFS band for UL transmissions in Cell_1. For example, the UL-CUBS may be transmitted at a maximum power (e.g., according to a maximum power control mode). Transmitting at maximum power may help ensure, for example, that the UL-CUBS is detected by other cells (e.g., Cell_2) that might otherwise transmit and interfere with transmissions between the UE and the Cell_1.

Figure 9A:
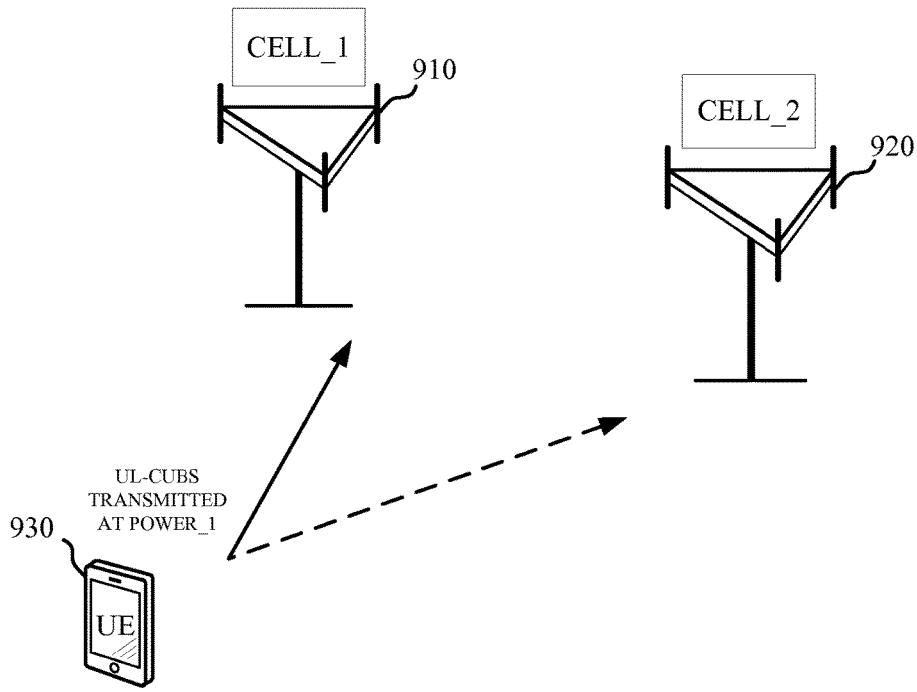
FIGS. 9A and 9B illustrate example scenarios for controlling transmission power of a UL-CUBS, in accordance with various aspects of the present disclosure.
Figure 9B:
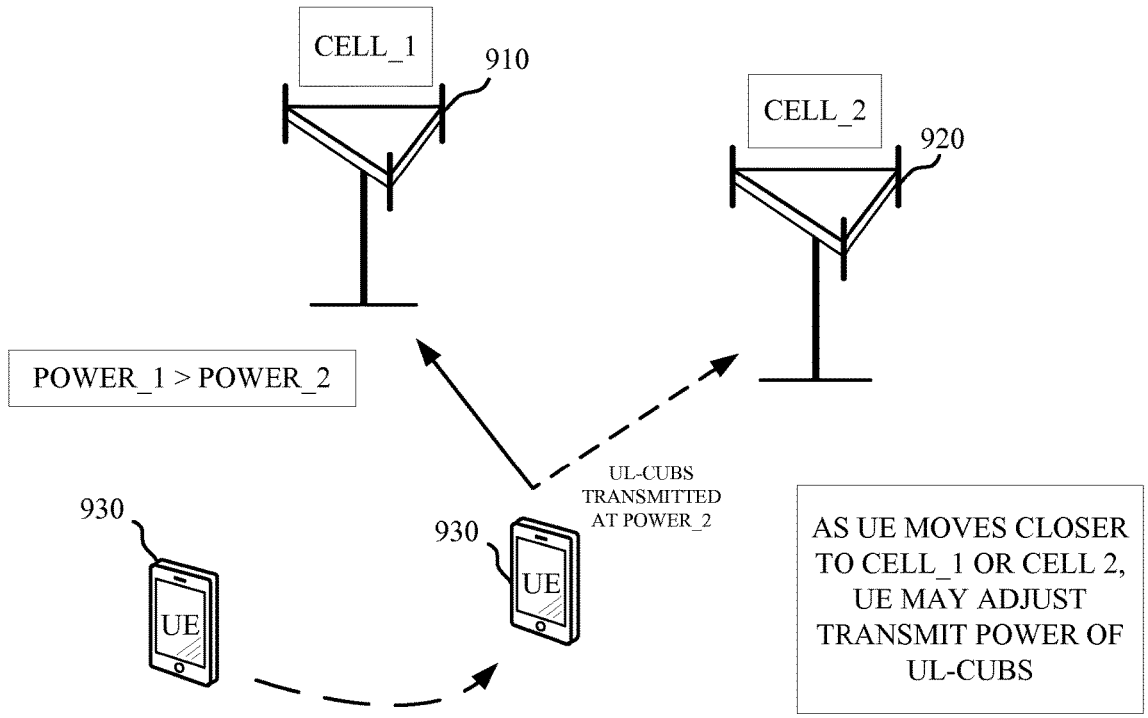

FIGS. 9A and 9B illustrate another example where the transmission power for UL-CUBS from a UE 930 may be controlled based, at least in part, on the adjustable power control mode (e.g., with the transmission power dynamically adjustable), in accordance with various aspects of the present disclosure. Dynamically adjusting transmission power for UL-CUBS may help avoid unnecessary power consumption by the UE.

As shown in FIG. 9A, while the UE is in proximity to Cell_1, but farther away from Cell_2 (e.g., as determined based on its location, path loss measurements, or the like), the UE may transmit the UL-CUBS at a first power level (e.g., Power_1). In other words, the first power level may be determined based on UE location (relative to cell base stations) when using an adjustable power control mode. In the illustrated example, the first power level may be selected to be sufficient for the UL-CUBS to be detected by Cell_2, even though a lower power level would be sufficient for detection by Cell_1.

As shown in FIG. 9B, as the UE moves between Cell_and Cell_2, the UE may dynamically adjust the transmit power of UL-CUBS. For example, in the illustrated example, as UE moves closer to Cell_2 (and remains relatively close to Cell_1), the UE may transmit UL-CUBS at a second power level (e.g., Power_2) that is lower than the first power level. The second power level may be selected such that is sufficient for both Cell_and Cell_2 to detect the UL-CUBS.

Figure 10A:
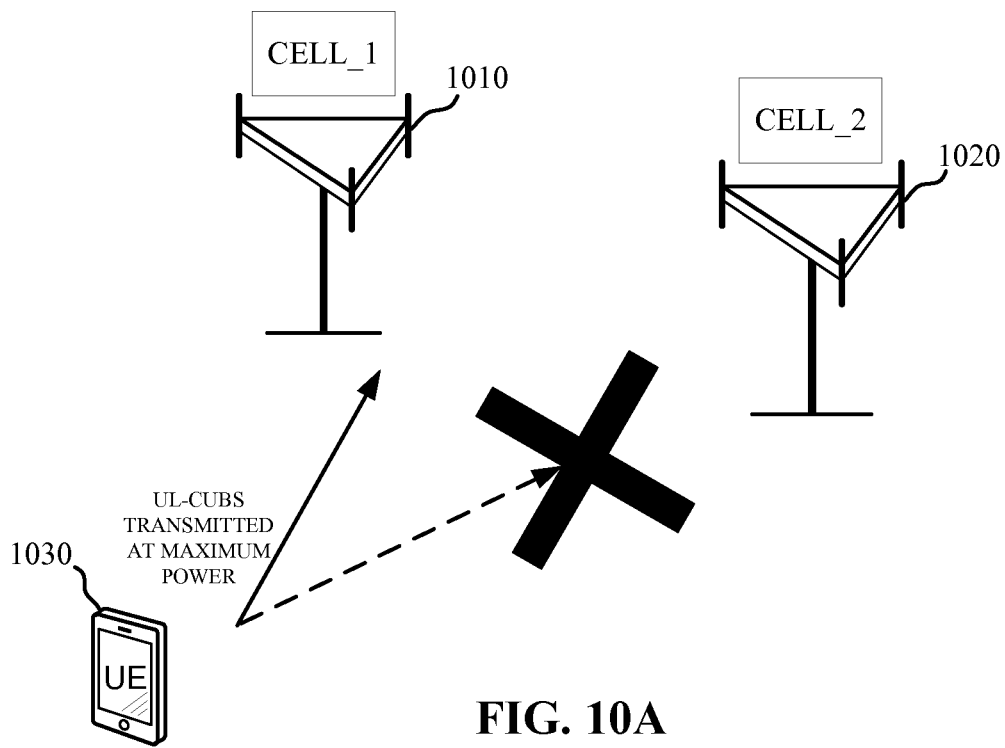
FIGS. 10A and 10B illustrate example scenarios for protecting uplink transmissions, in accordance with various aspects of the present disclosure.

As illustrated in FIG. 10A, in some scenarios, even when UE 830 transmits UL-CUBS at maximum power, Cell_2 (or other cells) may not detect the UL-CUBS and, as a result, the uplink communications to Cell_1 from UE 830 may still experience interference from Cell_2. This interference may occur, for example, if Cell_1 and Cell_2 try to access the same SRFS band and Cell_2 belongs to a different MNO (e.g., may be asynchronous), or is a Wi-Fi node.

Figure 10B:
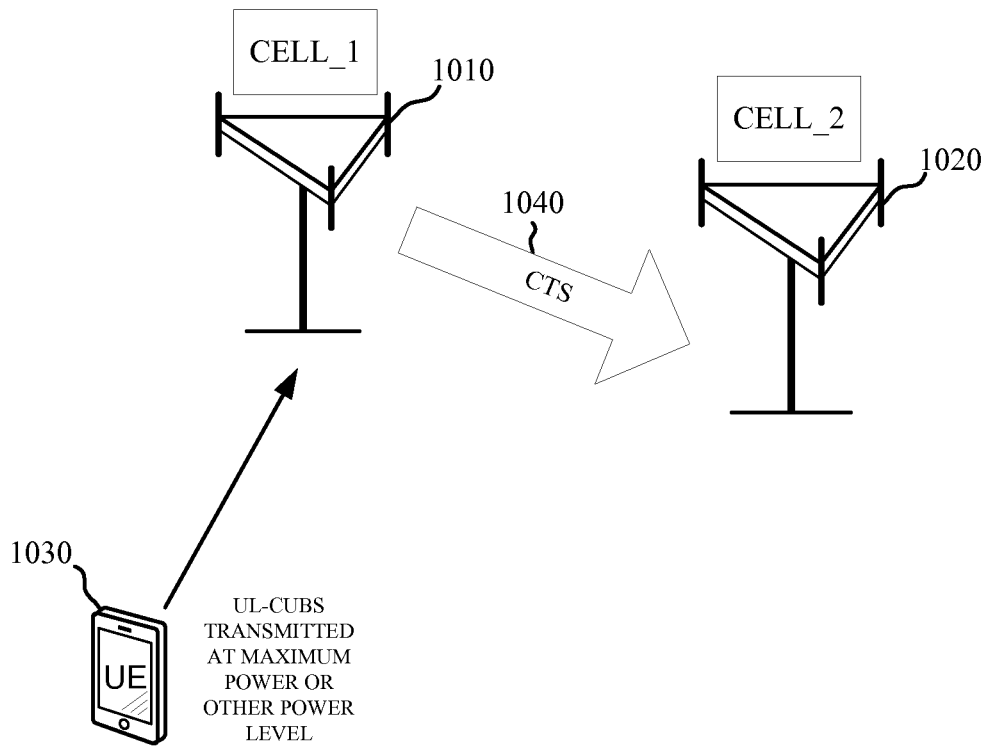

FIG. 10B illustrates one potential solution to this problem, by utilizing a Clear-to-Send (CTS) transmission from Cell_1. In other words, in response to detecting the UL-CUBS from UE 1030 (whether transmitted at maximum power or some other power level), the BS/eNodeB 1010 of Cell_1 may transmit a CTS signal (e.g., a CTS transmission by BS/eNodeB 1010) to reserve the communications channel of the SRFS band for the UE 1030. Because the BS/eNodeB 1010 may have less power constraints than UE 1030, the CTS signal may be transmitted at a sufficient power level to ensure that it is detected by the BS/eNodeB 1020 of Cell_2 (and other neighboring cells). BS/eNodeB 1010 may transmit a CTS signal in response to receiving the UL-CUBS (or after receiving some indication that Cell_2 did not receive the UL-CUBS). The CTS signal format may be based, for example, on LTE/LTE-A networks and may be the same or different from similar messages used in Wi-Fi networks.

In some cases, the transmit power level for UL-CUBS may also be based on cell detection/discovery. In other words, if the UE does not detect other cells (or has not detected other cells for some amount of time), the UE may transmit UL-CUBS at a power level that may be sufficient for detection by a serving cell. The UE may then adjust the power level, as appropriate, as it detects other cells.

According to certain aspects, the adjustable power control mode of controlling uplink transmission power (e.g., transmission power of the UL-CUBS) may be configured by associating UL-CUBS closed loop transmission power control with the transmission power of the PUSCH. For example, when UL-CUBS closed loop transmission power control is associated with the transmission power of the PUSCH, either transmission power or power parameters of the UL-CUBS or PUSCH may determine the transmission power or the power parameters for the UL-CUBS and PUSCH. According to certain aspects, the transmission power of UL-CUBS may be determined based, at least in part, on open loop parameters of the UL-CUBS having an offset based on the transmission power of the PUSCH. As an alternative to associating control of transmission power of UL-CUBS to transmission power of PUSCH, UL-CUBS closed loop power control may be determined or managed independently. According to certain aspects, transmission power of UL-CUBS may be controlled by UL-CUBS open loop power control.

Additionally or alternatively, according to certain aspects, the uplink transmission power may be controlled based, at least in part, on measurements provided by the UE. In other words, a UE may control uplink transmit power (e.g., per block 706 of FIG. 7) based on UE measurements (e.g., as directed by a BS per FIG. 11 or autonomously per FIG. 13).

Figure 11:
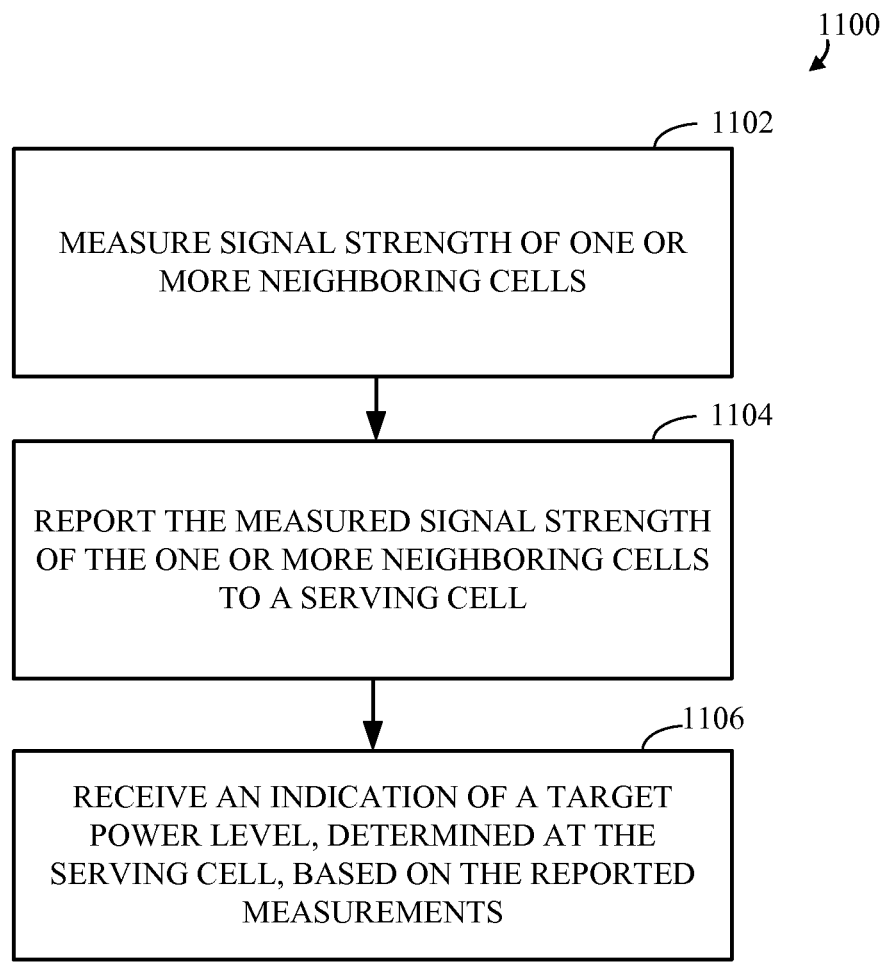
FIG. 11 illustrates an example flowchart for wireless communications by a user equipment, in accordance with various aspects of the present disclosure.

For example, FIG. 11 illustrates an example flowchart 1100 for wireless communications that may be performed, for example, by a UE (e.g., a UE 120 shown in FIGS. 1 and 15, UE 320 shown in FIG. 3, UE 1230 shown in FIG. 12, etc.), in accordance with various aspects of the present disclosure. The flowchart 1100 may be performed by a UE to control uplink transmission power based, at least in part, on measurements provided by the UE (as will be described in more detail below with reference to FIG. 12).

At 1102, the UE may measure the signal strength of one or more neighboring cells. At 1104, the UE may report the measured signal strength of the one or more neighboring cells to a serving cell. At 1106, the UE may receive an indication of a target power level, determined at the serving cell, based on the reported measurements.

Figure 12:
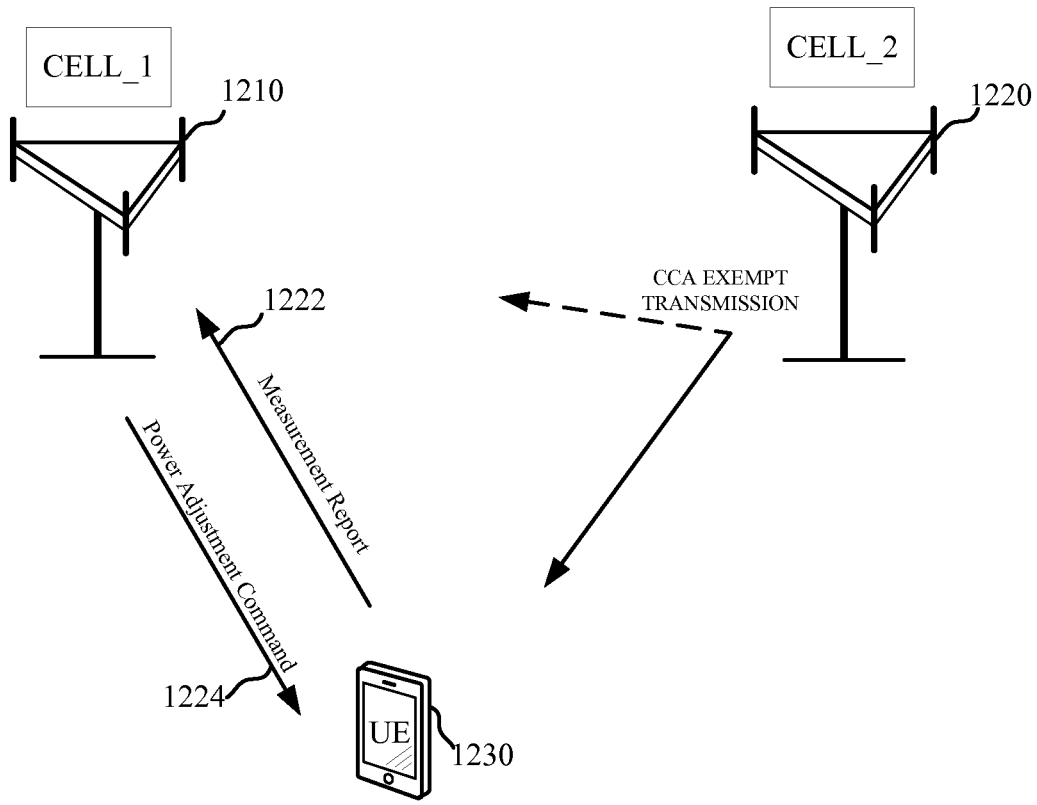
FIG. 12 illustrates an example scenario for controlling uplink transmission power, in accordance with various aspects of the present disclosure.

FIG. 12 illustrates an example scenario for controlling the uplink transmission power (e.g., for UL-CUBS and/or uplink subframes) based on measurements by the UE, in accordance with various aspects of the present disclosure. The UE 1230 may be any of the UEs 120 shown in FIGS. 1 and 15, UE 320 shown in FIG. 3, etc. Similarly, the BSs for Cell_1 1210 and Cell_2 1220 shown in FIG. 12 may be any of the BSs/eNodeBs 110 shown in FIGS. 1 and 14, BS/eNodeB 310 shown in FIG. 3, etc.

In the example shown in FIG. 12, UE 1230 associated with a serving cell deployed by a MNO (e.g., Cell_1 1210) may measure a signal strength of a neighboring cell (e.g., Cell_2 1220) belonging to a different MNO or a different RAT (e.g., Wi-Fi) than the serving cell and report the signal strength of the neighboring cell (e.g., in measurement report 1222) to the serving cell. In accordance with various aspects of the present disclosure, the serving cell may also perform measurements (e.g., a path loss) of the reported neighboring cell(s). For example, a serving cell and/or UE may perform measurements (e.g., measuring the signal strength, pathloss, etc.) of one or more neighboring cells, for example, operated by a different MNO, during a broadcast signal transmission (e.g., the CCA exempt transmission (CET) of the one or more neighboring cells). The UL transmission power of the UE may be controlled based, at least in part, on the measurement of one or more neighboring cells provided by the UE and the measurement of the one or more neighboring cells performed by the serving cell. As shown in FIG. 12, the UE may receive an indication of the UL transmission power control (e.g., in power adjustment command 1224) from the serving cell. For example, the UL transmission power may be controlled based, at least in part, on a path loss difference between the path loss measurements of a neighboring cell detected by the UE and the path loss measurements of the neighboring cell detected by the serving cell.

Figure 13:
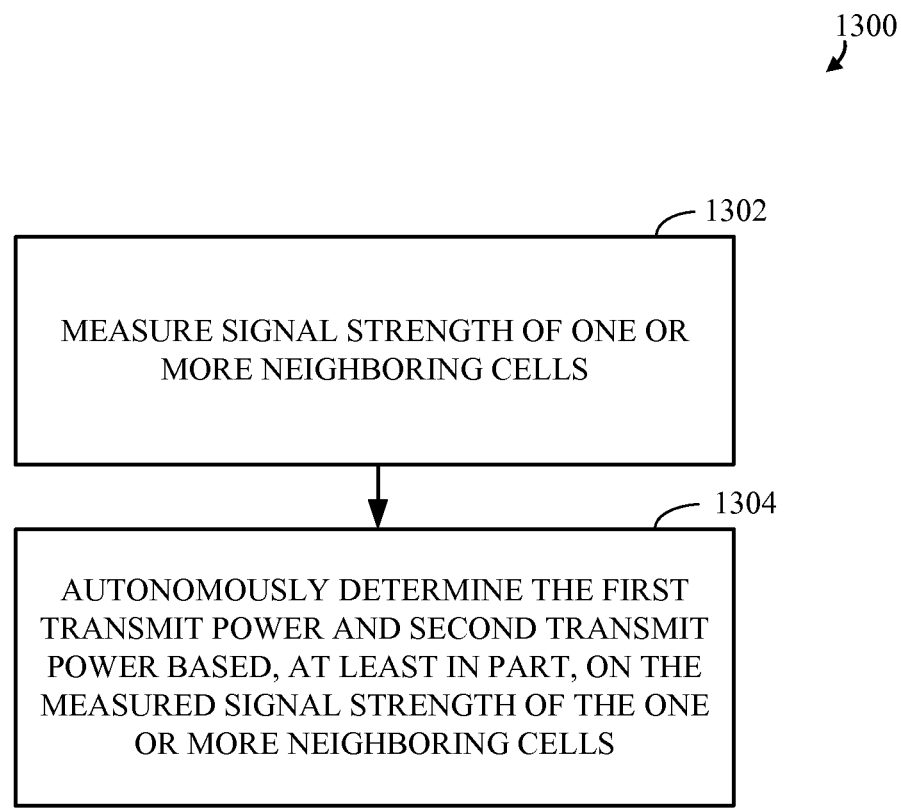
FIG. 13 illustrates an example flowchart for wireless communications by a user equipment, in accordance with various aspects of the present disclosure.

Alternatively, according to certain aspects, the UE may autonomously perform power control adjustment based on its measurement of the neighboring cells. FIG. 13, for example, illustrates an example flowchart 1300 for wireless communications that may be performed, for example, by a UE (e.g., a UE 120 shown in FIGS. 1 and 15, UE 320 shown in FIG. 3, etc.), in accordance with various aspects of the present disclosure. The flowchart 1300 may be performed by a UE to autonomously perform power control adjustment based on its measurement of the neighboring cells (e.g., as opposed to receiving commands from a BS based on measurement reports as described with reference to FIGS. 11 and 12).

At 1302, the UE may measure the signal strength of one or more neighboring cells. At 1304, instead of reporting the measured signal strength of the one or more neighboring cells to the serving cell and receiving a target power command from the serving cell based on the reported measurements, the UE may autonomously determine the first transmit power and second transmit power based, at least in part, on the measured signal strength of the one or more neighboring cells.

According to certain aspects, when cells are deployed under synchronous operations (e.g., even between different operators), the transmission power for the downlink communications and the uplink communications may vary across subframes within a frame. For example, when cells are deployed under synchronous operations, the cells may not experience a hidden node problem (as described above), because the cells are synchronized, their CCA opportunities may be aligned and thus one cell may detect signaling from another cell and, based on the detection, refrain from accessing and transmitting using the SRFS band.

According to certain aspects of the present disclosure, the transmission power for the uplink subframes may be controlled based on one or more of a plurality of power control modes of the frame (e.g., a maximum power control mode, an adjustable power control mode, and/or other types of power control modes). For example, the uplink subframes may be configured to transmit at maximum power when the frame is determined to operate in a maximum power control mode. In another example, the uplink subframes may be configured to transmit at an adjustable power when the frame is determined to operate in an adjustable power control mode. According to certain aspects, the transmission power for various uplink subframes may be different. The transmission power for different uplink subframes may be different due to different assignments and/or resource allocations for each of the different subframes. For example, the transmission powers for different uplink subframes may be different due to various combinations of UL channels assigned to each of the different uplink subframes (e.g., PUCCH, PUSCH, or a combination of both), and/or different resource allocations for a channel (e.g., different number of PRBs for PUSCH in different subframes). For example, a power spectral density (PSD) may be adjusted when different transmission powers are used for different uplink subframes.

According to certain aspects, when code division multiplexing (CDM) is used for PUCCH, it may be desirable to maintain comparable receive power levels for different UEs. For example, it may be possible to maintain maximum transmission power for PUSCH and dynamically adjust transmission power for PUCCH. According to certain aspects, the transmission power of uplink subframes may be controlled by uplink control information (UCI) operation using PUSCH (e.g., PUCCH may not be used). For example, the UCI may be transmitted by PUSCH (e.g., using PUSCH resources to transmit the UCI and not multiplexed on PUSCH).

According to certain aspects, the uplink transmission power may be determined by the base station or independently determined by the UE. For example, the power control commands may be signaled to the UE from the base station. The power control commands may indicate to the UE a power level (e.g., which one of the plurality of power control modes) determined for the radio frame. For example, the power control commands may be signaled in CET and/or CCA-based subframes (e.g., SF 5 subframe and/or SF 9 subframe). When the power control is configured for a cell, the power control commands may be broadcasted in the form of a group power control for the cell. When the power control is configured for a UE, the power control command may be unicasted to the UE. According to certain aspects, the power control commands may be based, at least in part, on a power control mode. The power control command may indicate a maximum transmission power when the power control mode is maximum power control mode. The power control command may indicate a variable transmission power when the power control mode is adjustable power control mode. For example, if the maximum UL power level for PUSCH is enforced, while PUCCH is still subject to power control, all downlink control information (DCI) (e.g., DL/UL grants) may have power control commands for PUCCH.

Power control commands may be signaled in different subframes within a given radio frame. In such cases, a UE may need to determine when to apply the power control commands. According to certain aspects, the power control commands may be applied at the beginning of uplink transmissions or in the middle of uplink transmissions (e.g., in the middle of a subframe or radio frame). According to certain aspects, a plurality of power control commands may be received and stored and the plurality of power control commands may be applied at or after frame boundaries (e.g., at the end of a radio frame). According to certain aspects, the power control commands may be omitted (e.g., not apply the power control commands) in the middle of a radio frame. In an aspect, the power control commands may be applied immediately at the beginning of a radio frame. In an aspect, the power control commands may be applied when there is a change in the power control modes.

According to certain aspects, power control may be performed in an uplink carrier aggregation (CA) scenario. In an uplink CA scenario, one or more component carriers (CCs) may be assigned to the UE for uplink transmission. For example, in case of a power limiting scenario (e.g., transmissions subject to a maximum transmission power), power scaling may be performed in an effort to ensure (e.g., after power scaling) consistent transmission power for UL-CUBS and regular (non CUBS) uplink subframes is maintained for each CC. According to certain aspects, if LTE/LTE-A power prioritization in LRFS is applied to power prioritization in SRFS, transmission power scaling for UL-CUBS may need to know or predict how power scaling will be done for PUCCH/PUSCH in uplink subframes. According to certain aspects, equal power scaling across CCs may be applied for both UL-CUBS and channels (e.g., PUCCH and/or PUSCH) in uplink subframes. According to certain aspects, equal power scaling across CCs may be applied without differentiation between different channel types.

According to certain aspects, power headroom reports (PHRs) may be generated in a manner designed to handle both PSD and total power constraints. For example, a PHR may indicate a minimum of PSD headroom and/or total power headroom, which may be derived based on maximum transmission power for a component carrier ($P_{CMAX,C}$) reporting. For example, a PHR may support reporting a plurality of types of $P_{CMAX,C}$ (e.g., Type 1: $P_{CMAX,C}$ PUSCH power, Type 2: $P_{CMAX,C}$–PUCCH power–PUSCH power) for each CC assigned to the UE. According to certain aspects, separate PSD headroom and power headroom reports may be possible.

According to certain aspects, the transmission power of physical random access channel (PRACH) transmissions may also be controlled. Various techniques may be used to control the transmission power of the PRACH transmissions. One technique may be to transmit the PRACH at maximum power (e.g., maximum power control mode). When the PRACH transmission is transmitted at maximum power (e.g., maximum power control mode), but still results in a failed attempt(s), repetition ramp-up may be performed (e.g., in subsequent transmissions of the PRACH, repeating the same PRACH transmission at maximum power but for a longer duration). For example, on a first attempt, one transmission time interval (TTI) may be used; if the first attempt fails, on a second attempt, two TTI may be used. Similarly, if the second attempt fails, on a third attempt, three TTI may be used, etc. The number of TTIs available for (repeated) PRACH transmissions may be subject to availability in the uplink subframes in a radio frame.

Another technique for controlling transmission power of a PRACH transmission may be to transmit the PRACH with adjustable transmission power (e.g., adjustable power control mode). For example, the power level for PRACH transmission in the SRFS band may be similarly determined for the power level for PRACH transmission in the LRFS (e.g., based on path loss measurement). The power ramp-ups for re-transmissions (e.g., during failed attempts) may be supported in adjustable power control mode. Another technique for controlling transmission power of the PRACH may be to have a combination of adjustable power control mode and repetition ramp-ups for re-transmissions (e.g., during failed attempts), as described above. According to certain aspects, the transmission power of PRACH transmission may be controlled based, at least in part, on a power level of the UL-CUBS. For example, the transmission power of the PRACH may be the same as the transmission power of the UL-CUBS.

Turning to FIG. 14, a diagram 1400 is shown that illustrates a BS or eNB 110*a* configured for SRFS band operation. The BS/eNodeB 110*a*, BS/eNodeB 110*b*, BS/eNodeB 110*c*, or a combination thereof, may be configured to implement at least some of the features and functions described above with respect to FIGS. 1-6 and 8-12. For example, the BS/eNodeB 110*a*, 110*b*, 110*c*, or a combination thereof, may be capable of performing flowcharts 500 and 600 shown in FIGS. 5 and 6, respectively. The BS/eNodeB 110*a*, 110*b*, 110*c* or a combination thereof, may include a processor module 1410, a memory module 1420, a transceiver module 1460, antennas 1440, and a transmission modes module 1490. The BS/eNodeB 110*a*, 110*b*, 110*c* or a combination thereof, may also include one or both of a communications management module 1450 and a network communications module 1470. Each of these components may be in communication with each other, directly or indirectly, over one or more buses.

The memory module 1420 may include RAM and ROM. The memory module 1420 may also store computer-readable, computer-executable software (SW) code 1424 containing instructions that are configured to, when executed, cause the processor module 1410 to perform various functions described herein for using LTE-based communications in an SRFS band. Alternatively, the software code 1424 may not be directly executable by the processor module 1410 but be configured to cause the computer, e.g., when compiled and executed, to perform functions described herein.

The processor module 1410 may include an intelligent hardware device, e.g., a CPU, a microcontroller, an ASIC, etc. The processor module 1410 may process information received through the transceiver module 1460, the communications management module 1450, and/or the network communications module 1470. The processor module 1410 may also process information to be sent to the transceiver module 1460 for transmission through the antennas 1440, to the communications management module 1450, and/or to the network communications module 1470. The processor module 1410 may handle, alone or in connection with the transmission modes module 1490, various aspects of using LRFS band based communications in an SRFS band.

The transceiver module 1460 may include a modem configured to modulate the packets and provide the modulated packets to the antennas 1440 for transmission, and to demodulate packets received from the antennas 1440. The transceiver module 1460 may be implemented as one or more transmitter modules and one or more separate receiver modules. The transceiver module 1460 may support communications in an LRFS band (e.g., LTE) and in an SRFS band. The transceiver module 1460 may be configured to communicate bi-directionally, via the antennas 1440, with one or more UEs 120. The BS/eNodeB 110*a* may typically include multiple antennas 1440 (e.g., an antenna array). The BS/eNodeB 110*a* may communicate with a network controller 130-*a* through the network communications module 1470. The BS/eNodeB 110*a* may communicate with other BSs, such as the BS/eNodeB 110*b* and the BS/eNodeB 110*c*, using the communications management module 1450.

The communications management module 1450 may manage communications with stations and/or other devices. The communications management module 1450 may be in communication with some or all of the other components of the BS/eNodeB 110*a* via the bus or buses. Alternatively, functionality of the communications management module 1450 may be implemented as a component of the transceiver module 1460, as a computer program product, and/or as one or more controller elements of the processor module 1410.

The transmission modes module 1490 may be configured to perform and/or control some or all of the functions or aspects described above related to performing communications in an SRFS band. For example, the transmission modes module 1490 may be configured to support a supplemental downlink mode, a carrier aggregation mode, and/or a stand-alone mode. The transmission modes module 1490 may include an LRFS transmission mode module 1492 configured to handle LRFS band communications and an SRFS transmission mode module 1494 configured to handle SRFS band communications. The transmission modes module 1490, or portions of it, may be a processor. Moreover, some or all of the functionality of the transmission modes module 1490 may be performed by the processor module 1410 and/or in connection with the processor module 1410.

Turning to FIG. 15, a diagram 1500 is shown that illustrates a UE 120 configured for SRFS band operation. The UE 120 may include or be part of a personal computer (e.g., laptop computer, netbook computer, tablet computer, etc.), a cellular telephone, a PDA, a digital video recorder (DVR), an internet appliance, a gaming console, an e-readers, etc. The UE 120 may have an internal power supply (not shown), such as a small battery, to facilitate mobile operation. The UE 120 may be configured to implement at least some of the features and functions described above with respect to FIGS. 1-4 and 7-13 described above.

The UE 120 may include a processor module 1510, a memory module 1520, a transceiver module 1540, antennas 1550, and a transmission modes module 1560. Each of these components may be in communication with each other, directly or indirectly, over one or more buses.

The memory module 1520 may include random access memory (RAM) and read-only memory (ROM). The memory module 1520 may store computer-readable, computer-executable software (SW) code 1524 containing instructions that are configured to, when executed, cause the processor module 1510 to perform various functions described herein for communicating in an SRFS band. Alternatively, the software code 1524 may not be directly executable by the processor module 1510 but be configured to cause the computer (e.g., when compiled and executed) to perform functions described herein.

The processor module 1510 may include an intelligent hardware device, e.g., a central processing unit (CPU), a microcontroller, an application-specific integrated circuit (ASIC), etc. The processor module 1510 may process information received through the transceiver module 1540 and/or to be sent to the transceiver module 1540 for transmission through the antennas 1550. The processor module 1510 may handle, alone or in connection with the transmission modes module 1560, various aspects of using LRFS band based communications in an SRFS band.

The transceiver module 1540 may be configured to communicate bi-directionally with base stations (e.g., BS/eNodeBs 110). The transceiver module 1540 may be implemented as one or more transmitter modules and one or more separate receiver modules. The transceiver module 1540 may support communications in an LRFS band (e.g., LTE) and in an SRFS band. The transceiver module 1540 may include a modem configured to modulate the packets and provide the modulated packets to the antennas 1550 for transmission, and to demodulate packets received from the antennas 1550. While the UE 120 may include a single antenna, there may be embodiments in which the UE 120 may include multiple antennas 1550.

According to the architecture of FIG. 15, the UE 120 may further include a communications management module 1530. The communications management module 1530 may manage communications with various access points. The communications management module 1530 may be a component of the UE 120 in communication with some or all of the other components of the UE 120 over the one or more buses. Alternatively, functionality of the communications management module 1530 may be implemented as a component of the transceiver module 1540, as a computer program product, and/or as one or more controller elements of the processor module 1510.

The transmission modes module 1560 may be configured to perform and/or control some or all of the functions or aspects described above related to using LRFS band based communications in an SRFS band. For example, the transmission modes module 1560 may be configured to support a supplemental downlink mode, a carrier aggregation mode, and/or a standalone mode. The transmission modes module 1560 may include an LRFS transmission mode module 1562 configured to handle LRFS band communications and an SRFS transmission mode module 1564 configured to handle SRFS band communications. The transmission modes module 1560, or portions of it, may be a processor. Moreover, some or all of the functionality of the transmission modes module 1560 may be performed by the processor module 1510 and/or in connection with the processor module 1510.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In one or more exemplary designs, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, the expression "at least one of a or b" is meant to include a, b, or the combination of both a and b.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, by a base station (BS), on a shared radio frequency spectrum (SRFS) band, comprising:
   winning contention to the SRFS band for at least a portion of a radio frame period, wherein the radio frame period comprises a plurality of subframe periods;
   transmitting a first signal at a first transmit power during a first period; and
   transmitting a second signal at a second transmit power during a second period, wherein the first transmit power and the second transmit power are controlled based, at least in part, on a power level determined for the radio frame period, and wherein the power level for the radio frame period is determined based, at least in part, on a first path loss, measured by a user equipment (UE), of a neighboring cell and a second path loss, measured by the BS, of the neighboring cell.

2. The method of claim 1, wherein the SRFS band comprises an unlicensed radio frequency spectrum (URFS) band.

3. The method of claim 1, wherein the first transmit power and the second transmit power are of a same transmit power level.

4. The method of claim 1, wherein the first signal transmitted during the first period comprises a downlink channel usage beacon signal (DL-CUBS).

5. The method of claim 1, wherein the second transmit power is controlled by at least one of: transmitting downlink signals and supplemental signals in downlink subframes of the radio frame period, adjusting transmission duration in the downlink subframes of the radio frame period, power increasing signals transmitted in the downlink subframes of the radio frame period, or adjusting a number of resource blocks (RBs) assigned for transmission in the downlink subframes of the radio frame period.

6. A method for wireless communications, by a user equipment (UE), on a shared radio frequency spectrum (SRFS) band, comprising:
   winning contention to the SRFS band for at least a portion of a radio frame period, wherein the radio frame period comprises a plurality of subframe periods;
   transmitting a first signal at a first transmit power during a first subframe period of the radio frame period; and
   transmitting a second signal at a second transmit power during a second subframe period of the radio frame period, wherein the first transmit power and the second transmit power are controlled based, at least in part, on a power level determined for the radio frame period, and wherein the power level for the radio frame period is determined based, at least in part, on a first path loss, measured by the UE, of one or more neighboring cells and a second path loss, measured by a serving base station, of the one or more neighboring cells.

7. The method of claim 6, wherein the SRFS band comprises an unlicensed radio frequency spectrum (URFS) band.

8. The method of claim 6, wherein the first transmit power and the second transmit power are of a same transmit power level.

9. The method of claim 6, wherein the first signal transmitted during the first subframe period comprises an uplink channel usage beacon signal (UL-CUBS).

10. The method of claim 9, wherein the first transmit power and the second transmit power are controlled via a closed loop power control.

11. The method of claim 10, wherein:
    the second signal comprises a physical uplink shared channel (PUSCH) transmission; and
    the second transmit power for the PUSCH transmission is based at least in part on the first transmit power.

12. The method of claim 9, wherein the first transmit power and the second transmit power are based, at least in part, on an open loop control.

13. The method of claim 6, further comprising:
    measuring signal strength of one or more neighboring cells; and
    reporting the measured signal strength of the one or more neighboring cells to a serving cell.

14. The method of claim 13, further comprising receiving an indication of a target power level determined at the serving cell based on reported measurements.

15. The method of claim 13, wherein at least one of the one or more neighboring cells are associated with a different operator than the serving cell or associated with a different radio access technology (RAT) than the serving cell.

16. The method of claim 13, further comprising autonomously determining the first transmit power and the second transmit power based, at least in part, on the measured signal strength of the one or more neighboring cells.

17. The method of claim 6, wherein the second transmit power is based, at least in part, on one or more uplink channels transmitted in an uplink subframe period.

18. The method of claim 17, wherein the second transmit power is based, at least in part, on at least one of: a fixed transmission power for a physical uplink shared channel (PUSCH) or a dynamically adjustable transmission power for a physical uplink control channel (PUCCH).

19. The method of claim 6, wherein the power level for the radio frame period is further determined based, at least in part, on a signaling of one of a plurality of power control modes selected by the serving base station.

20. The method of claim 19, wherein the one of the plurality of power control modes is selected by the serving base station based on at least one of: channel or interference conditions or deployment scenarios.

21. The method of claim 6, wherein:
the second signal comprises a physical random access channel (PRACH) transmission.

22. The method of claim 21, wherein the second transmit power is increased via an adjustable power control mode in subsequent transmissions of the PRACH.

23. The method of claim 21, wherein if there are one or more failed transmission attempts of the PRACH, transmission of the PRACH is repeated in multiple transmission time intervals (TTIs) in subsequent transmissions of the PRACH.

24. The method of claim 6, wherein the first transmit power and second transmit power are controlled such that consistent transmit power for the first transmit power and the second transmit power is maintained for each of one or more component carriers of a plurality of component carriers.

25. The method of claim 24, further comprising:
determining a maximum power limitation; and
based, at least in part, on the maximum power limitation, controlling first and second transmit powers by performing power scaling for at least one component carrier among two or more component carriers, wherein power scaling is such that after scaling, consistent transmit power for the first subframe period and the second subframe period is maintained for the at least one component carrier.

26. The method of claim 6, further comprising transmitting a power headroom report (PHR) including a power spectral density (PSD) and a total power headroom.

27. An apparatus for wireless communications on a shared radio frequency spectrum (SRFS) band, comprising:
at least one processor configured to:
win contention to the SRFS band for at least a portion of a radio frame period, wherein the radio frame period comprises a plurality of subframe periods;
transmit a first signal at a first transmit power during a first period; and
transmit a second signal at a second transmit power during a second period, wherein the first transmit power and the second transmit power are controlled based, at least in part, on a power level determined for the radio frame period, and wherein the at least one processor is configured to determine the power level for the radio frame period based, at least in part, on a first path loss, measured by a user equipment (UE), of a neighboring cell and a second path loss, measured by the apparatus, of the neighboring cell; and
a memory coupled with the at least one processor.

28. An apparatus for wireless communications on a shared radio frequency spectrum (SRFS) band, comprising:
at least one processor configured to:
win contention to the SRFS band for at least a portion of a radio frame period, wherein the radio frame period comprises a plurality of subframe periods;
transmit a first signal at a first transmit power during a first subframe period of the radio frame period; and
transmit a second signal at a second transmit power during a second subframe period of the radio frame period, wherein the first transmit power and the second transmit power are controlled based, at least in part, on a power level determined for the radio frame period, and wherein the at least one processor is configured to determine the power level for the radio frame period based, at least in part, on a first path loss, measured by the apparatus, of one or more neighboring cells and a second path loss, measured by a serving base station, of the one or more neighboring cells; and
a memory coupled with the at least one processor.

* * * * *